(12) United States Patent
Bendlin et al.

(10) Patent No.: US 11,432,283 B2
(45) Date of Patent: *Aug. 30, 2022

(54) FRAME STRUCTURE COORDINATION IN WIRELESS COMMUNICATION SYSTEMS WITH INTEGRATED ACCESS AND BACKHAUL LINKS IN ADVANCED NETWORKS

(71) Applicant: AT&T Intellectual Property I, L.P., Atlanta, GA (US)

(72) Inventors: Ralf Bendlin, Cedar Park, TX (US); Thomas Novlan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/983,002

(22) Filed: Aug. 3, 2020

(65) Prior Publication Data

US 2020/0367237 A1 Nov. 19, 2020

Related U.S. Application Data

(63) Continuation of application No. 16/153,794, filed on Oct. 7, 2018, now Pat. No. 10,757,700.

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/005* (2013.01); *H04L 27/2675* (2013.01);
(Continued)

(58) Field of Classification Search
None
See application file for complete search history.

(56) References Cited

U.S. PATENT DOCUMENTS 8,036,137 B2 10/2011 Bossler et al.
9,001,799 B2 4/2015 Chun et al.
(Continued)

FOREIGN PATENT DOCUMENTS

WO 2017/086570 A1 5/2017
WO 2017/135760 A1 8/2017
(Continued)

OTHER PUBLICATIONS

International Preliminary Report and Patentability for International Application No. PCT/US2019/054813 dated Apr. 8, 2021, 14 pages.
(Continued)

*Primary Examiner* — Saad Khawar
(74) *Attorney, Agent, or Firm* — Amin, Turocy & Watson, LLP

(57) ABSTRACT

Facilitating frame structure coordination in wireless communication systems with integrated access and backhaul links in advanced networks (e.g., 4G, 5G, and beyond) is provided herein. Operations of a system can comprise facilitating a first configuration of a first group of flexible symbols and facilitating a second configuration of a first pattern defined for an uplink transmission. Further, the operations can comprise facilitating a third configuration of a second pattern defined for a downlink transmission and facilitating a fourth configuration of a second group of flexible symbols. Flexible symbols can be symbols within a slot that are not defined as uplink symbols or downlink symbols.

20 Claims, 20 Drawing Sheets

(51) Int. Cl.
*H04L 27/26* (2006.01)
*H04W 56/00* (2009.01)
*H04W 72/12* (2009.01)
*H04W 88/04* (2009.01)
*H04W 88/14* (2009.01)

(52) U.S. Cl.
CPC ..... *H04W 56/001* (2013.01); *H04W 72/1205* (2013.01); *H04W 88/04* (2013.01); *H04W 88/14* (2013.01)

(56) References Cited

U.S. PATENT DOCUMENTS

| | | | |
|---|---|---|---|
| 9,648,616 | B2 | 5/2017 | Talukdar et al. |
| 9,743,405 | B2 | 8/2017 | Parkvall et al. |
| 10,057,389 | B2 | 8/2018 | Fechtel |
| 2008/0298336 | A1 | 12/2008 | Gollamudi |
| 2013/0336271 | A1 | 12/2013 | Kinnunen et al. |
| 2017/0150462 | A1 | 5/2017 | Zeng et al. |
| 2017/0208574 | A1 | 7/2017 | Ramakrishna et al. |
| 2017/0295589 | A1 | 10/2017 | Sundararajan et al. |
| 2017/0338920 | A1 | 11/2017 | Kim et al. |
| 2018/0091267 | A1 | 3/2018 | Kim et al. |
| 2018/0110041 | A1 | 4/2018 | Bendlin et al. |
| 2018/0220414 | A1 | 8/2018 | Yin et al. |
| 2018/0249374 | A1 | 8/2018 | Park et al. |
| 2018/0262313 | A1 | 9/2018 | Nam et al. |
| 2018/0279304 | A1 | 9/2018 | Lee et al. |
| 2019/0037565 | A1 | 1/2019 | Zheng et al. |
| 2019/0230686 | A1* | 7/2019 | Li ............... H04W 72/0446 |
| 2019/0268904 | A1 | 8/2019 | Miao et al. |
| 2019/0305923 | A1* | 10/2019 | Luo ............... H04W 72/12 |
| 2019/0313419 | A1 | 10/2019 | Fakoorian et al. |
| 2020/0112953 | A1* | 4/2020 | Bendlin ............... H04L 5/005 |

FOREIGN PATENT DOCUMENTS

| | | |
|---|---|---|
| WO | 2017/157312 A1 | 9/2017 |
| WO | 2017/171398 A1 | 10/2017 |
| WO | 2017/188730 A1 | 11/2017 |
| WO | 2017/188733 A1 | 11/2017 |
| WO | 2018/174692 A1 | 9/2018 |

OTHER PUBLICATIONS

Mogensen et al., "5G small cell optimized radio design," Globecom. IEEE Conference and Exhibition, 2013, pp. 111-116, IEEE, 7 pages.
Pedersen et al., "A flexible 5G frame structure design for frequencydivision duplex cases." IEEE Communications Magazine, https://core.ac.uk/download/pdf/60651595.pdf, Mar. 2016, 8 pages.
Dutta et al., "Frame structure design and analysis for millimeter wave cellular systems" Draft, https://arxiv.org/pdf/1512.05691.pdf, Aug. 2016, 31 pages.
Lahetkangas et al., "On the TDD subframe structure for beyond 4G radio access network." Future Network and Mobile Summit (FutureNetworkSummit), 2013, 11 pages.
Non-Final Office Action received for U.S. Appl. No. 16/153,794 dated Nov. 8, 2019, 40 pages.
Invitation To Correct Defects In The International Application received for PCT Application Serial No. PCT/US2019/054813 dated Oct. 16, 2019, 2 pages.
International Search Report and Written Opinion received for PCT Application Serial No. PCT/US2019/054813 dated Mar. 4, 2020, 23 pages.
ZTE Corporation, "Discussion on TDD configurations for NR test model", 3GPP Draft; R4-1812579, URL: http://www.3gpp.org/ftp/tsg%5Fran/WG4% 5FRadio/ TSGR4%5F88Bis/ Docs/R4%2D1812579%2E, Sep. 28, 2018, 5 pages.
Huawei et al.,"TDD configurations for FR2", 3GPP Draft; R4-1813279, URL:http://www.3gpp.org/ftp/tsg%5Fran/WG4%5FRadio/TSGR4% 5F88BiS/Docs/R4%2D1813279%2Ezip, Sep. 28, 2018, 6 pages.
OPPO: "Discussion of backhaul link enhancement for IAB", 3GPP Draft; R1-1808879, URL: http://www.3gpp.org/ftp/tsg%5Fran/WG1% 5FRL1/TSGR15F94b/Docs/R1%2D1810387%2Ezip, Aug. 10, 2018, 4 pages.
Vivo, "Enhancements to support NR backhaul link", 3GPP Draft; R1-1810387 URL:http://www.3gpp.org/ftp/tsg%5Fran/WG1%5FRL1/ TSGR1%5F94b/Docs/R1%2D1810387%2Ezip, Sep. 29, 2018, 9 pages.

* cited by examiner

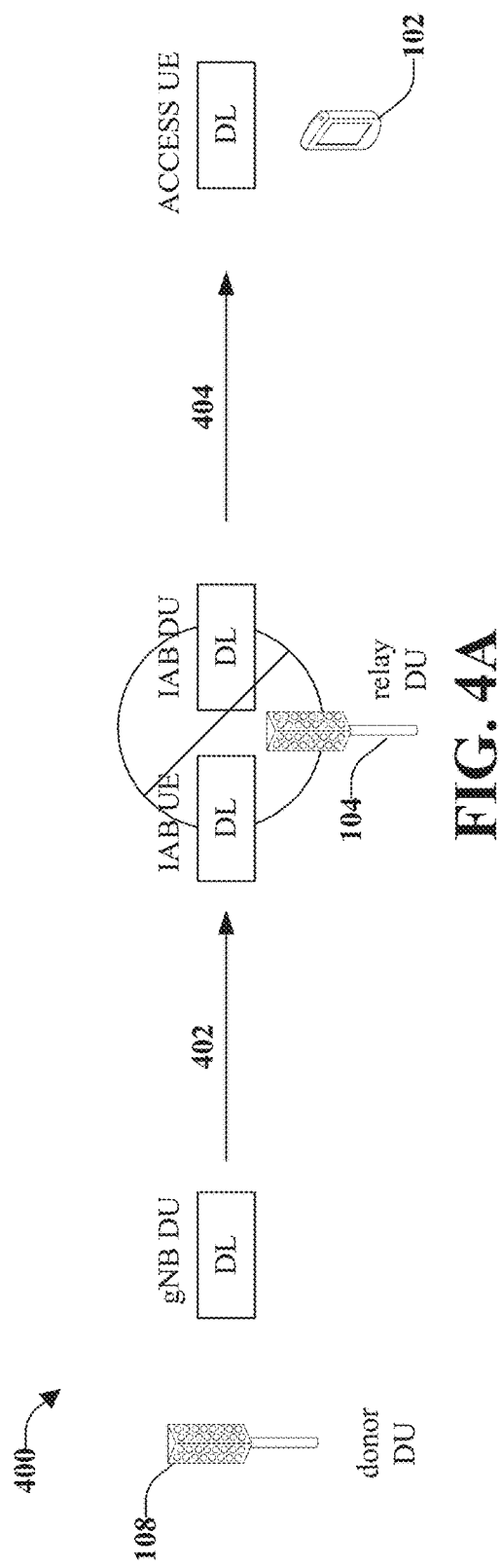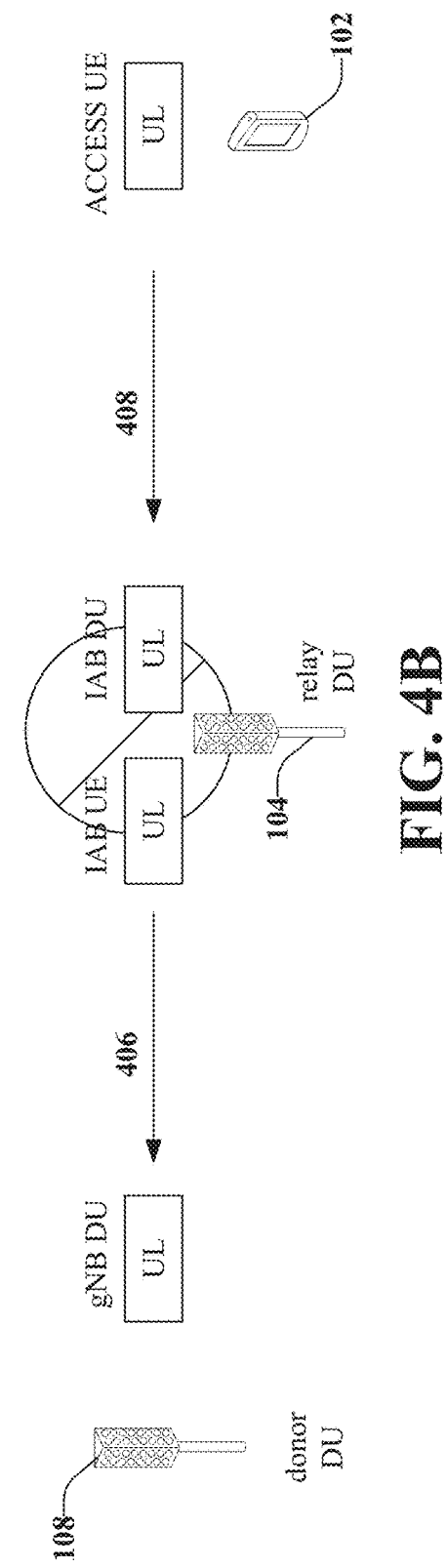

FRAME STRUCTURE COORDINATION IN WIRELESS COMMUNICATION SYSTEMS WITH INTEGRATED ACCESS AND BACKHAUL LINKS IN ADVANCED NETWORKS

RELATED APPLICATION

The subject patent application is a continuation of, and claims priority to, U.S. patent application Ser. No. 16/153,794 (now U.S. Pat. No. 10,757,700), filed Oct. 7, 2018, and entitled "FRAME STRUCTURE COORDINATION IN WIRELESS COMMUNICATION SYSTEMS WITH INTEGRATED ACCESS AND BACKHAUL LINKS IN ADVANCED NETWORKS," the entirety of which application is hereby incorporated by reference herein.

TECHNICAL FIELD

This disclosure relates generally to the field of mobile communication and, more specifically, to frame structure coordination in wireless communication systems for advanced networks (e.g., 4G, 5G, and beyond).

BACKGROUND

Integrated Access and Backhaul (IAB) is a technology that leverages the air interface of existing wireless communications standards such as the 3rd Generation Partnership Project's (3GPP) New Radio (NR) air interface to deploy wireless backhaul links integrated with the cellular network serving user equipment. Specifically, IAB operates the backhaul link on the same spectrum with which base stations and mobile terminals communicate with one another. User Equipment (UE) connects to a relay Distributed Unit (DU), which acts as a traditional base station from the UE perspective. Further, the relay DU connects to a donor DU via a relay/backhaul link and, therefore, the relay DU acts as a UE from the perspective of the donor DU. However, due to a half-duplex constraint, the Relay DU cannot receive from the donor DU on the backhaul link and transmit to the UE on the access link at the same time.

BRIEF DESCRIPTION OF THE DRAWINGS

Various non-limiting embodiments are further described with reference to the accompanying drawings in which:

FIGS. 4A and 4B illustrate an example, non-limiting, wireless communications system that violates a half-duplex constraint;

DETAILED DESCRIPTION

Figure 1:
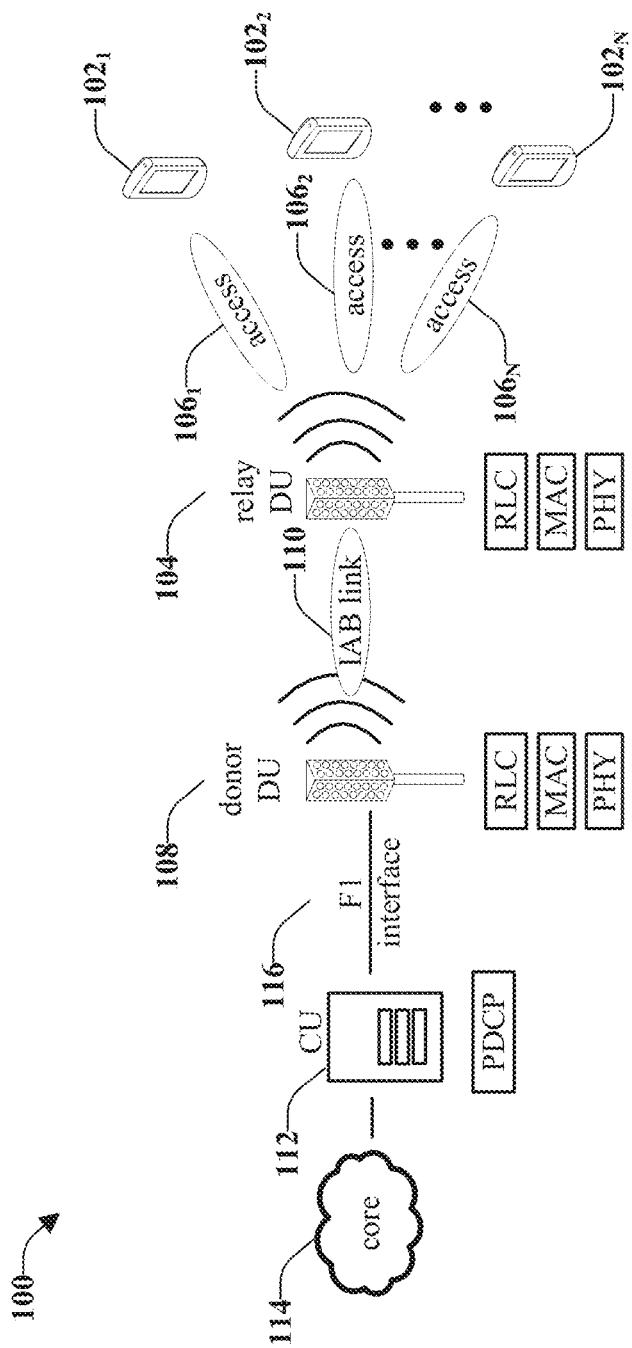
FIG. 1 illustrates an example, non-limiting, embodiment of a mobile network (e.g., a wireless communications system) in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate coordination of frame structures across donor Distribution Units (DU) and/or relay DU. According to an implementation, provided is a Time Division Duplex (TDD) Uplink (UL)/Downlink (DL) pattern that can fulfil requirements arising from a half-duplex constraint. The TDD UL/DL pattern can be configured at a donor DU and/or a relay DU via backhaul signaling, according to an implementation.

In accordance with another implementation, provided is coordination of frame structures that utilize existing TDD UL/DL patterns. In accordance with this implementation, an offset can be introduced that can be configured at the donor DU and/or relay DU via backhaul signaling.

According to another implementation, provided is coordination of frame structures that can utilize existing TDD UL/DL patterns. In accordance with this implementation, instead of an offset that can be configured at donor DU and/or relay DU via backhaul signaling, a dedicated downlink slot can be configured at the donor DU and/or relay DU via backhaul signaling. This downlink slot can be used to align synchronization signal and broadcast channel transmission across donor DU and/or relay DU.

Further, a receiver and corresponding reference signal structure and rate matching procedure are provided herein. The receiver and corresponding reference signal structure and rate matching procedure can allow for simultaneous reception of asynchronous waveforms according to some implementations.

In an embodiment, described herein is a system that can comprise a processor and a memory that stores executable instructions that, when executed by the processor, facilitate performance of operations. The operations can comprise facilitating a first configuration of a first group of flexible symbols and facilitating a second configuration of a first pattern defined for an uplink transmission. Further, the operations can comprise facilitating a third configuration of a second pattern defined for a downlink transmission and facilitating a fourth configuration of a second group of flexible symbols. Flexible symbols can be symbols within a slot that are not defined as uplink symbols or downlink symbols.

According to an example, the operations further comprise aligning the first pattern with a last symbol of a first frame defined for the uplink transmission. Further to this example, the operations can comprise aligning the second pattern with a first symbol of a second frame defined for the downlink transmission. The last symbol of the first frame and the first symbol of the second frame can be contiguous symbols.

According to some implementations, the operations can comprise defining a first number of flexible symbols in the first group of flexible symbols based on a first length of the first pattern and a second length of a transmission frame. The operations can also comprise defining a second number of flexible symbols in the second group of flexible symbols based on a third length of the second pattern and the second length of the transmission frame.

In accordance with some implementations, the operations can comprise explicitly indicating a transmission configuration. The transmission configuration can comprise a first indication of the first group of flexible symbols, a second indication of the first pattern, a third indication of the second pattern, and a fourth indication of the second group of flexible symbols.

In some implementations, the operations can comprise implicitly indicating a transmission configuration. According to these implementations, the transmission configuration can comprise a first indication of the first group of flexible symbols, a second indication of the first pattern, and a third indication of the second pattern, and a fourth indication of the second group of flexible symbols.

In accordance with some implementations, the operations can comprise determining that respective values of at least one of the first group of flexible symbols, the first pattern, the second pattern, and the second group of flexible symbols are larger than a first number of symbols in the slot. Further, the operations can comprise configuring the first group of flexible symbols, the first pattern, the second pattern, and the second group of flexible symbols with respective single parameters based on the determining. The respective single parameters can comprise respective indications of respective second numbers of symbols.

According to some implementations, the operations can comprise determining that respective values of at least one of the first group of flexible symbols, the first pattern, the second pattern, and the second group of flexible symbols are larger than a first number of symbols in the slot. Further to these implementations, the operations can comprise configuring the first group of flexible symbols, the first pattern, the second pattern, and the second group of flexible symbols with respective first parameters and respective second parameters based on the determining. The respective first parameters can comprise first indications of respective slots. The respective second parameters can comprise second indications of respective second numbers of symbols.

In another embodiment, described herein is a method that can comprise offsetting, by a device comprising a processor, a transmission pattern by a defined number of slots determined based on a radio frame boundary. The method can also comprise facilitating, by the device, a first transmission via a downlink. The first transmission can be scheduled based on the offsetting. Further, the method can comprise facilitating, by the device, a second transmission via an uplink. The second transmission can be scheduled based on the offsetting.

In an example, offsetting the transmission pattern can comprise offsetting the transmission pattern by a length of a downlink transmission. Further to this example, the method can comprise, prior to the facilitating the first transmission via the downlink, facilitating, by the device, a third transmission via the downlink. Thus, two consecutive downlink transmission can be sent prior to an uplink transmission. In another example, the radio frame boundary can be aligned across devices by a system frame number.

In other examples, offsetting the transmission pattern can comprise aligning the first transmission with a first symbol of a frame defined for the downlink. In another example, offsetting the transmission pattern can comprise aligning the second transmission with a last symbol of a frame defined for the uplink.

In another embodiment, described herein is a system that can comprise a processor and a memory that stores executable instructions that, when executed by the processor, facilitate performance of operations. The operations can comprise configuring a first transmitter with a first rate matching data transmission based on a first demodulation reference signal pattern. The operations can also comprise configuring a second transmitter with a second rate matching data transmission based on a second demodulation reference signal pattern.

According to some implementations, the operations can comprise shifting the first rate matching data transmission and the first demodulation reference signal pattern with respect to the second rate matching data transmission and the second demodulation reference signal pattern. According to additional or alternative implementations, the operations can comprise configuring the first transmitter to send the first demodulation reference signal pattern on a first set of tones and configuring the second transmitter to send the second demodulation reference signal pattern on a second set of tones.

According to an example, the first demodulation reference signal pattern and the second demodulation reference signal pattern are respective single symbol front loaded demodulation reference symbol patterns. According to another example, the first demodulation reference signal pattern and the second demodulation reference signal pattern are respective single symbol front loaded demodulation reference symbol patterns with an additional demodulation reference symbol. According to yet another example, the first demodulation reference signal pattern and the second demodulation reference signal pattern are respective two-symbol front loaded demodulation reference symbol patterns.

The methods and operations (e.g., processes and logic flows) described in this specification can be performed by devices (e.g., a relay DU, donor DU, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 19 and FIG. 20.

As mentioned above, Integrated Access and Backhaul (IAB) is a technology that leverages the air interface of existing wireless communications standards such as the 3rd Generation Partnership Project's (3GPP) New Radio (NR) air interface to deploy wireless backhaul links integrated with the cellular network serving user equipment. Specifically, IAB operates the backhaul link on the same spectrum with which base stations and mobile terminals communicate with one another.

For example, FIG. 1 illustrates an example, non-limiting, embodiment of a mobile network (e.g., a wireless communications system 100) in accordance with one or more embodiments described herein.

User Equipment (UE), illustrated as a first UE $102_1$, a second UE $102_2$, through an Nth UE $102_N$, where N is an integer, can connect to a relay DU 104. For example, the UEs (e.g., the first UE $102_1$, the second UE $102_2$, and the Nth UE $102_N$) can connect to the relay DU 104 via respective access links (e.g., a first access link $106_1$, a second access link $106_2$, through an Nth access link $106_N$). The relay DU 104 can operate (e.g., function) as a traditional base station from the perspective of the UEs (e.g., the first UE $102_1$, the second UE $102_2$, and the Nth UE $102_N$).

The relay DU 104 can connect to a donor DU 108 via a relay/backhaul link. The relay/backhaul link (e.g., IAB Link 110) can share the same air interface as the access link (e.g., the first access link $106_1$, the second access link $106_2$, through the Nth access link $106_N$) between the UEs (e.g., the first UE $102_1$, the second UE $102_2$, and the Nth UE $102_N$) and the relay DU 104.

The IAB link 110 between the donor DU 108 and the relay DU 104 can carry user plane and control plane data for all the UEs (e.g., the first UE $102_1$, the second UE $102_2$, and the Nth UE $102_N$) being served by the relay DU 104. Hence, the IAB link 110 can comprise multiplexed packets for/from multiple different bearers serving the UEs that are being served by the relay DU 104, as well as multiplexed packets from the backhaul communication between the relay DU 104 and the donor DU 108. As noted above, the same spectrum is being used for both backhaul and access links, and as such, an IAB link can employ different multiplexing schemes to allow for UL and DL transmissions using the backhaul and access links.

Further, unlike the relay DU 104, the donor DU 108 can have a wired connection to a Centralized Unit (CU 112), which can connect to the core network (CN 114). The network interface (e.g., communications interface) between the CU 112 and donor DU 108 can be referred to as the F1 (or F1-U) interface 116 (e.g., per 3GPP specifications). Although not illustrated, according to some implementations, the Donor DU 108 can serve one or more UEs.

Figure 2:
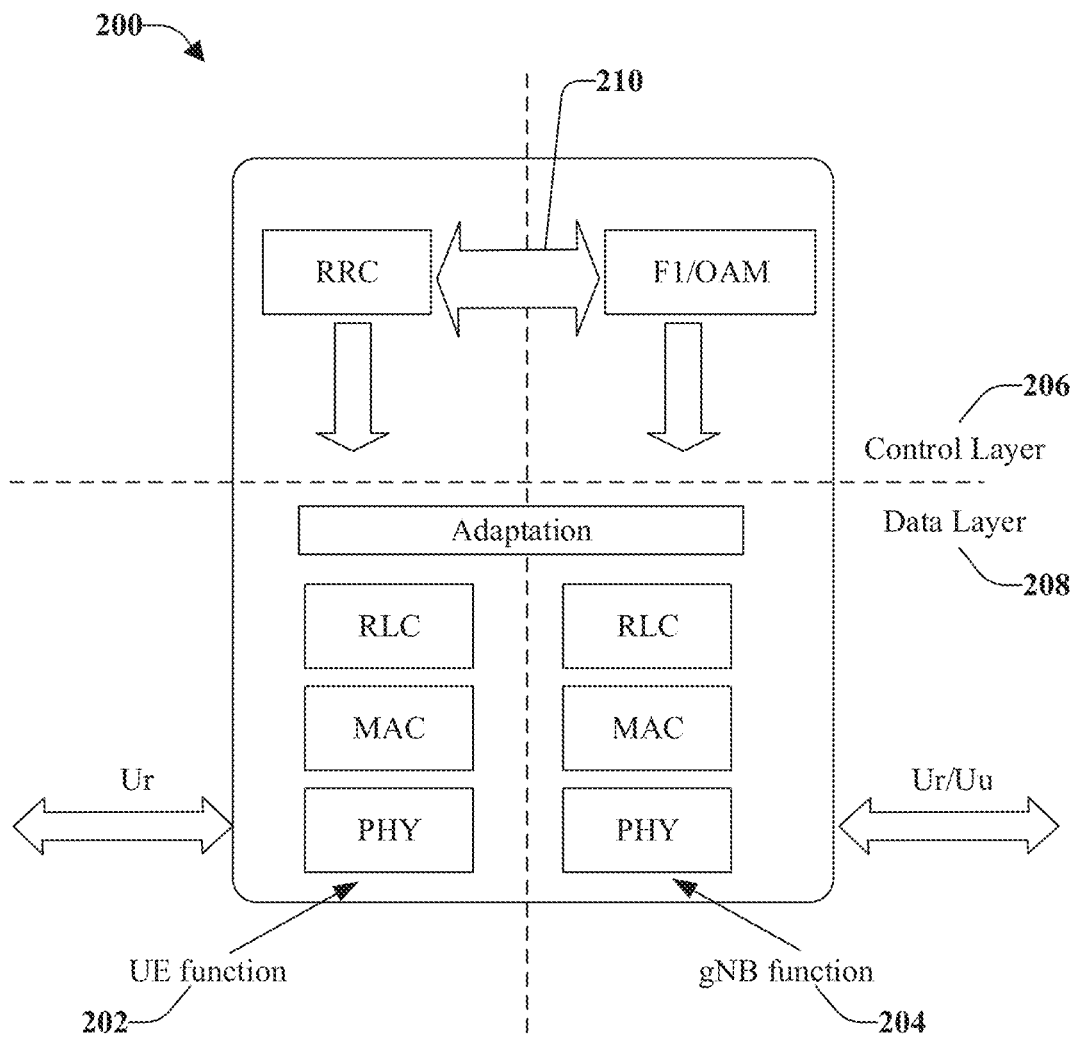
FIG. 2 illustrates an example, non-limiting, integrated access and backhaul protocol stack for a relay distributed unit according to an embodiment.

FIG. 2 illustrates an example, non-limiting, integrated access and backhaul protocol stack 200 for a relay distributed unit according to an embodiment. Repetitive description of like elements employed in other embodiments described herein is omitted for sake of brevity.

A relay DU (e.g., the relay DU 104) can comprise a UE function and a gNB function. Accordingly, the integrated access and backhaul protocol stack 200 is illustrated with a vertical line separating a UE function 202 (depicted on the left) and a gNB function 204 (depicted on the right). Further, the integrated access and backhaul protocol stack 200 is illustrated with a horizontal line separating a control layer 206 and a data layer 208. Further, an IAB control interface 210 provides the interface between the UE function 202 and the gNB function 204.

With the UE function 202, the relay DU can communicate with the donor DU (e.g., the donor DU 108). With the gNB function 204, the relay can operate (function) as the base station for the user equipment (e.g., the first UE $102_1$, the second UE $102_2$, and the Nth UE $102_N$) with which it is connected and/or to another relay DU.

Generally, IAB systems attempt to leverage the air interface and protocol stack of the technology it is integrated with to the largest extent possible. However, both air interface and protocol stack can be enhanced for the purpose of optimizing IAB. The various aspects provided herein relate to such optimizations.

Figure 3:
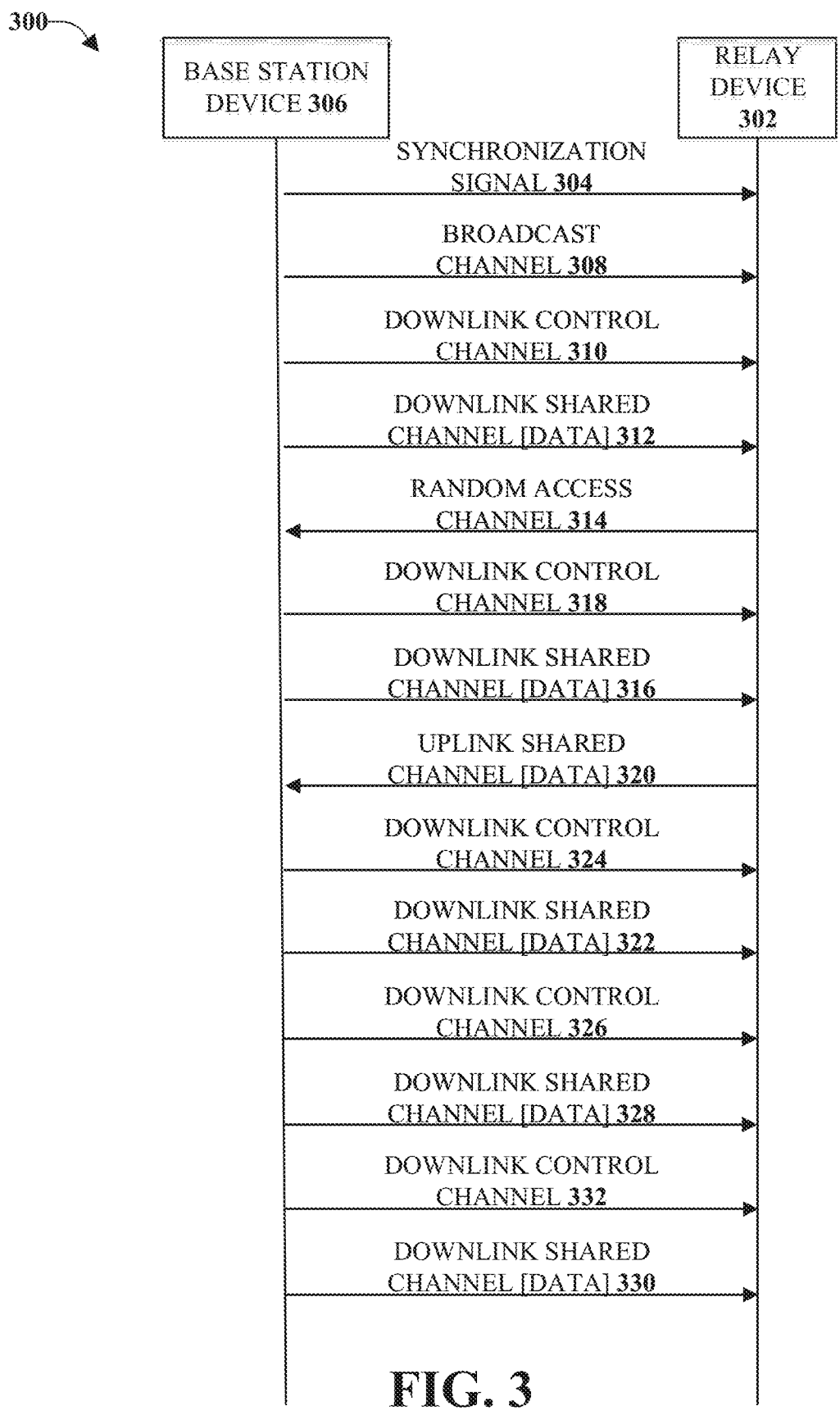
FIG. 3 illustrates an example, non-limiting, integrated access and backhaul configuration procedure for a relay according to an embodiment.

FIG. 3 illustrates an example, non-limiting, integrated access and backhaul configuration procedure 300 for a relay according to an embodiment. Repetitive description of like elements employed in other embodiments described herein is omitted for sake of brevity.

The UE function (e.g., the UE function 202) of a relay DU 302 or relay device (e.g., the relay DU 104) can decode one or more synchronization signals 304 from another relay DU or a donor DU 306 or base station device (e.g., the donor DU 108). Subsequently, the relay DU 302 can decode a broadcast channel 308 from the same base station (e.g., the donor DU 306). The payload of the broadcast channel 308 configures the UE function of the relay DU 302 to receive a downlink control channel 310 which schedules a downlink shared channel 312. The payload of the downlink shared channel 312 configures the UE function of the relay DU 302 to transmit a random access channel 314. The donor DU 306 responds to the random access channel transmission 314 with a random access response (RAR) carried on a downlink shared channel 316 scheduled by a downlink control channel 318. The RAR configures the UE function of the relay DU 302 to transmit an uplink shared channel 320. If the random access channel transmission 314 collided with other random access channel transmissions, the donor DU 306 sends a contention resolution message on a downlink shared channel 322 scheduled by a downlink control channel 324. The donor DU 306 then configures the relay DU 302 (UE and gNB function thereof) via a downlink shared channel 328 scheduled by a downlink control channel 326. The donor DU 306 can then commence sending data to the relay DU 302 via a downlink shared channel 330 scheduled by a downlink control channel 332. The relay DU 302 receives the data on the backhaul link configured by the backhaul configuration procedure 300 and sends it to user equipment (e.g., the first UE $102_1$, the second UE $102_2$, and the Nth UE $102_N$) with which it is connected.

FIGS. 4A and 4B illustrate an example, non-limiting, wireless communications system 400 that violates a half-duplex constraint. Repetitive description of like elements employed in other embodiments described herein is omitted for sake of brevity.

As illustrated in FIG. 4A, the relay DU 104 cannot receive from the donor DU on the backhaul link (illustrated at 402)

and transmit to a user equipment on the access link (illustrated at 404) at the same time. This is referred to as the half-duplex constraint. For example, the transmitted signal on the access link (e.g., illustrated at 404) would mask the received signal on the backhaul link (e.g., illustrated at 402), which has significantly less power due to the pathloss between the donor DU 108 and the relay DU 104. It is noted that the received power is reciprocally proportional to the square of the distance between the two.

In a similar manner, as illustrated in FIG. 4B, the relay DU 104 cannot transmit to the donor DU 108 on the backhaul link (as illustrated at 406) and receive from a user equipment on the access link (illustrated at 408) at the same time. Therefore, the donor and relay nodes (e.g., the donor DU 108 and the relay DU 104) should coordinate their frame structure with one another. The frame structure determines, amongst others, which time domain resources are reserved for the uplink (e.g., uplink slots are for transmissions from the UE to the relay DU or from the UE function of the relay DU to the donor DU) and which time domain resources are reserved for the downlink (e.g., downlink slots are for transmissions from the relay DU (e.g., gNB function) to the UE or from the donor DU to the UE function of the relay DU). An exemplary coordination is illustrated in FIGS. 5 and 6.

Figure 5:
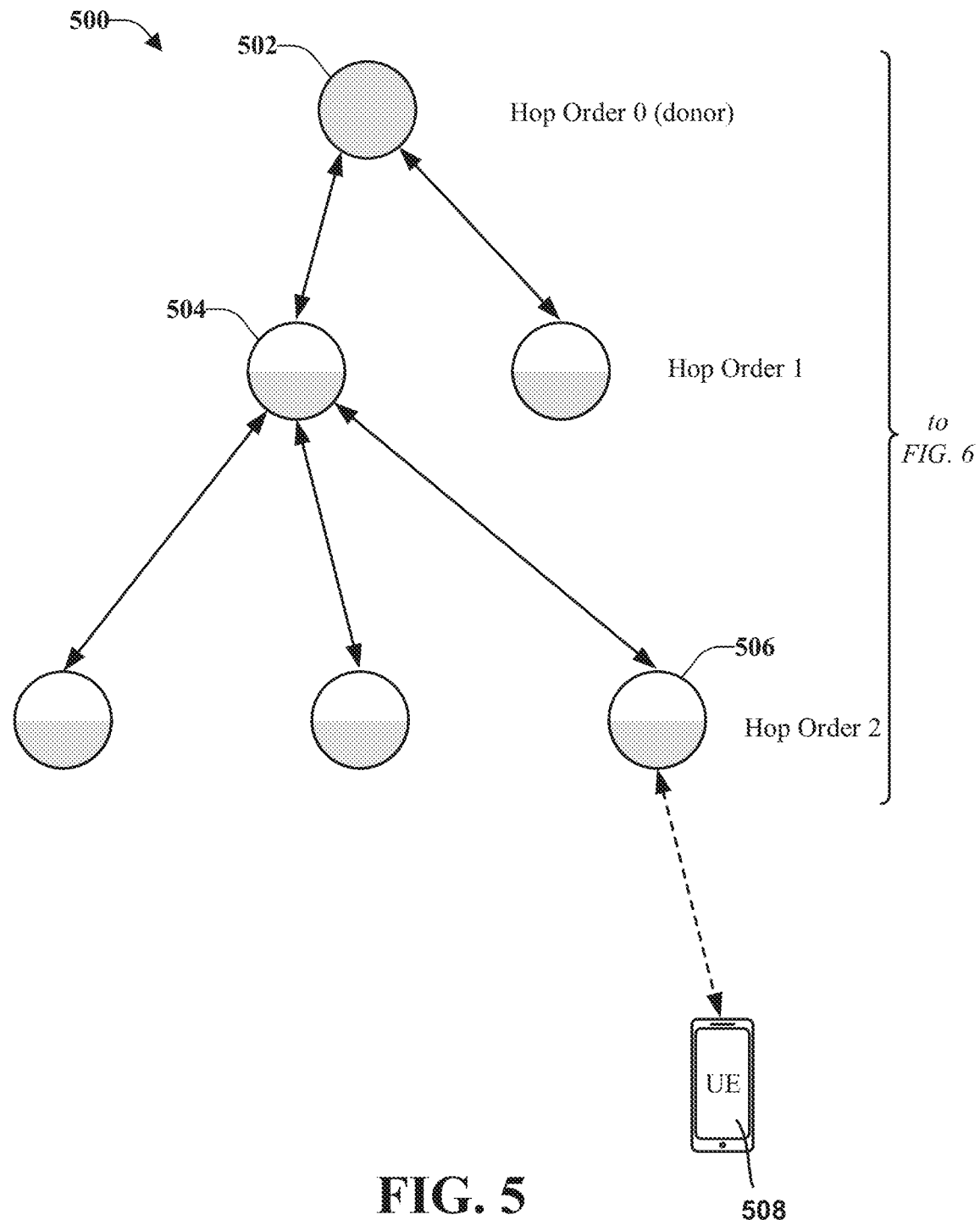
FIGS. 5 and 6 exemplify the concept of hops and associated integrated access and backhaul frame structures in accordance with various aspects and implementations of the subject disclosure.
Figure 6:
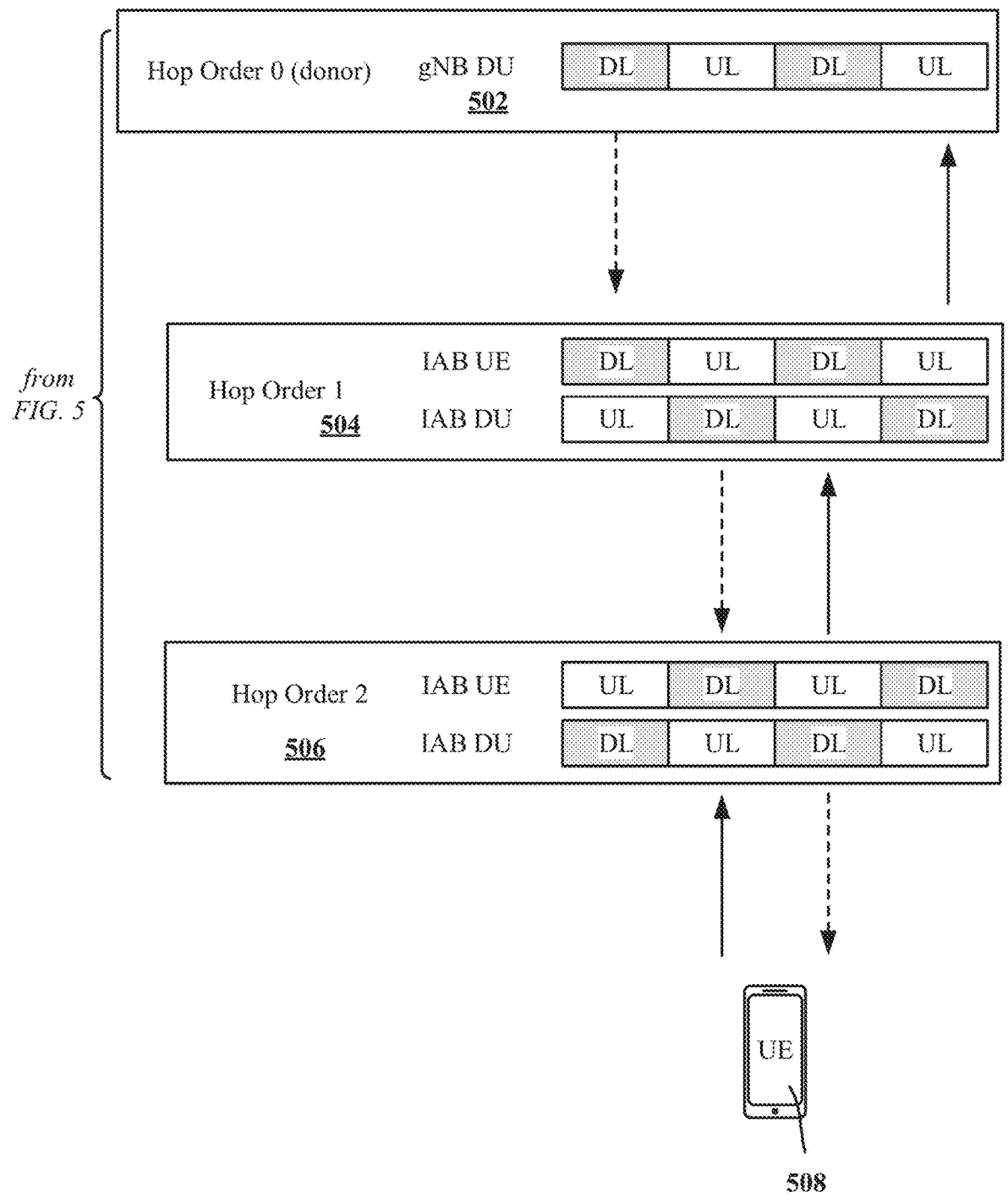

In further detail, FIGS. 5 and 6 illustrate a hierarchy of nodes 502, 504 and 506 and a UE 508 demonstrating a hop order to the UE 508 and corresponding frame structures (FIG. 6). There can be different time and/or frequency partitions between the access and backhaul links. As illustrated in the frame structure design of FIG. 6, which supports multi-hop topologies (FIG. 5), a second order relay node 506 can transmit to the first order relay node 504 when the latter is receiving from the donor node 502 (hop 0). When the donor gNB (hop 0) node 502 sends download transmissions to the relay node 504 of hop order 1, the relay node 504 is receiving, and thus can schedule access UEs (an actual UE or a second order relay IAB node, e.g., 506, whose gNB it is) in the uplink.

The frame structure can be semi-statically coordinated across the IAB nodes via centralized or distributed coordination mechanisms. Alternatively, the frame structure coordination mechanisms can enable the partitioning of time slots and frequency resources across multiple backhaul hops to support orthogonal resources for access and backhaul links at a given IAB node. In another alternative, the frame structure coordination mechanisms can enable alignment of DL transmission with UL reception slots as well as alignment of DL reception with UL transmission slots at the IAB node.

In centralized coordination, one node determines the downlink and/or uplink frame structure for the relay nodes according to the IAB network topology and hop order of the nodes). For example, the downlink/uplink frame structure can be semi-statically configured based on the hop order using RRC (radio resource control) signaling from the parent/donor IAB node to IAB node UE function, which internally coordinates using a control plane interface (IAB-C) to inform the IAB DU (distributed unit) function of the desired frame structure pattern. In another alternative, the downlink/uplink frame structure may be provided to the DU function via F1/OAM (Operation and Maintenance) messages over higher layer control plane signaling, which can be routed over one or more backhaul hops from a central unit (CU) or RAN (radio access network) controller. In yet another alternative the frame structure is provided by an anchor carrier (e.g., LTE or sub 6 GHz NR carrier) in the case of non-standalone (NSA) operation for IAB nodes.

In distributed coordination, each node only determines the downlink/uplink frame structure for the relay nodes that are connecting to it. With the relay nodes of each hop order determining the downlink and/or uplink frame structure for relays connecting to it, the downlink/uplink frame structure is determined for the whole topology. The coordination message signaling can be based on higher layer signaling, including system information broadcast, RRC from the parent node, modified F1 signaling, Backhaul RLC channel control signaling, or signaled via another carrier (e.g., via LTE or NR anchor carrier).

However, for both centralized and distributed coordination, depending on traffic load variations, route/topology updates, link interruption/failure events, QoS requirements, congestion/overload indications, or radio measurements including RSRP (reference signal received power), RSSI (received signal strength indication), RSRQ (received signal quality indication), and/or CLI (Cross-link interference) measurements, the available downlink/uplink resources shared between access and backhaul links at a given IAB node may be dynamically optimized. More particularly, with respect to dynamic resource coordination for IAB nodes, scheduled resources that would otherwise go unused with semi-static coordination can be used by dynamic resource coordination.

Figure 7:
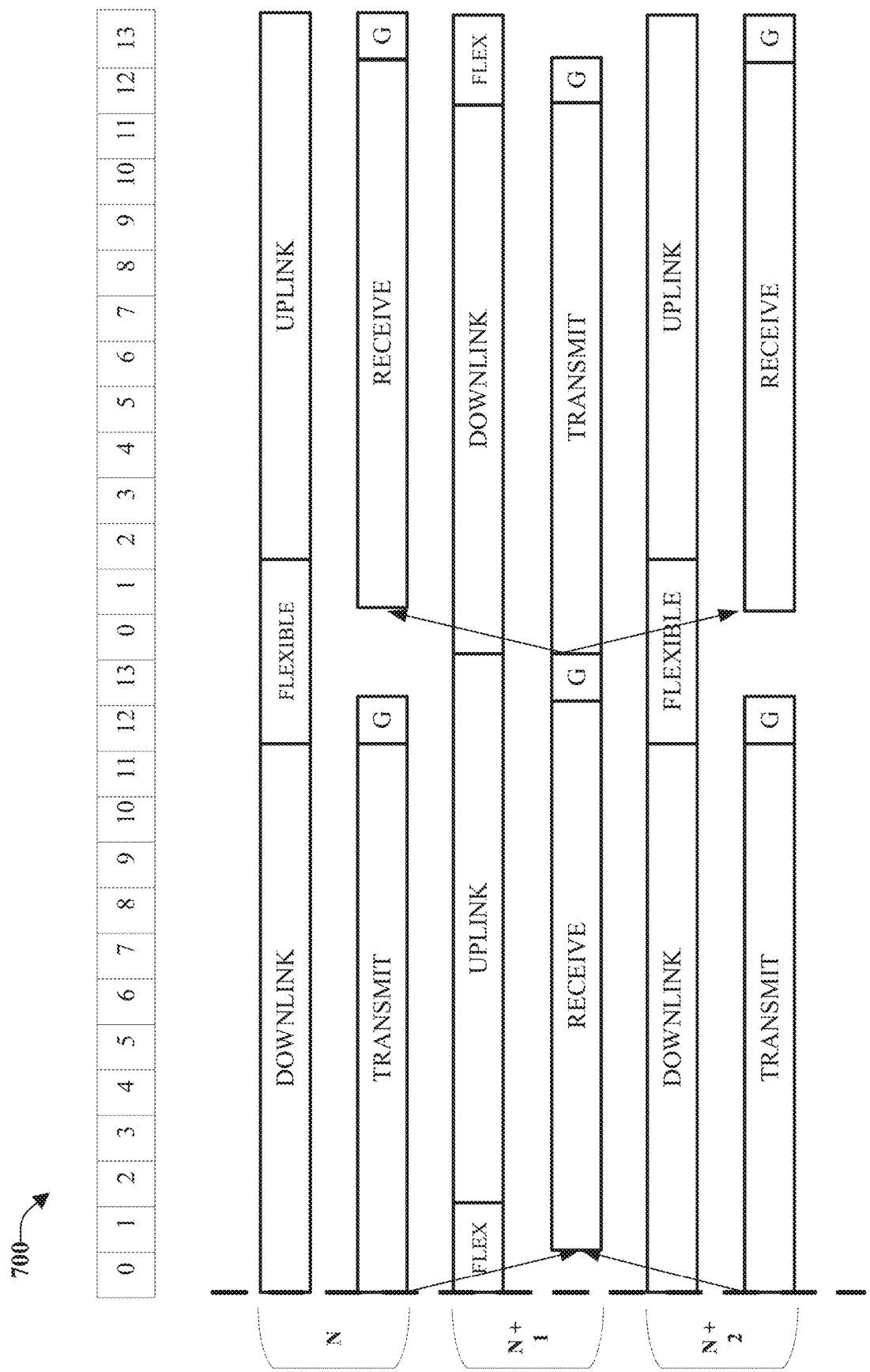
FIG. 7 illustrates an example, non-limiting, timing advance in accordance with one or more embodiments described herein.

In an IAB network, the distances between a plurality of UEs with respect to a relay DU can be random. Similarly, a plurality of relay DUs can connect to a donor DU. Then, the distances between a plurality of relay DUs with respect to the donor DU can be random. Since access and backhaul are integrated in IAB, both a plurality of UEs and a plurality of relay DUs can be connected to a relay or donor DU simultaneously, each with random distances. The distance between a transmitter and a receiver can be proportional to the propagation delay between the two (e.g., the time it takes for a waveform to travel from the first to the second). Ideally, the receiver (e.g., a relay or donor DU), wants to receive all uplink transmissions simultaneously. Assuming an orthogonal frequency-division multiplexing (OFDM) system, simultaneous means that all waveforms are received such that they all begin within the duration of the cyclic prefix of an OFDM symbol. Since the distances are random, and thus the propagation delays, in order to fulfil synchronous reception, the relay or donor DU configures a timing advance for each uplink transmission. This applies to both access UEs and the UE function of a relay DU. The timing advance is illustrated in FIG. 7 and FIGS. 8-11. In FIG. 7 the relay DUs are deployed such that all the relay DUs experience the same propagation delays. In FIGS. 8-11 different relay DUs experience different propagation delays. Thus, in FIG. 7 and FIGS. 8-11, the same and different timing advances are assumed, respectively.

In addition, there can be a benefit in aligning all downlink transmissions from all relay/donor DUs. In other words, it can be beneficial for all slot boundaries of all relay/donor DUs to be aligned. This is only true in symmetric deployments as depicted in FIG. 7. In a network without IAB, the base station can configure the timing advance of each UE without restriction. In IAB systems, however, due to the half-duplex constraint, a relay DU transmits uplink to another relay/donor DU and downlink to access and UE functions of relay DUs simultaneously. Hence, the timing of the UL (e.g., the timing advance) and the timing of the downlink (e.g., the slot boundary) are coupled. If the timing advances are asymmetric (see FIGS. 8-11) the relay DU cannot align its slot boundary and be configured with an arbitrary timing advance, one that matches its distance to the receiver, at the same time.

The various aspects discussed herein provide configuration and signaling details as well as detailed patterns. Further, the disclosed aspects provide a receiver and corresponding reference signal structure and rate matching procedure that allows to align downlink slot boundaries of donor/relay DUs while also allowing simultaneous reception of access and backhaul link transmissions in the uplink.

Figure 8:
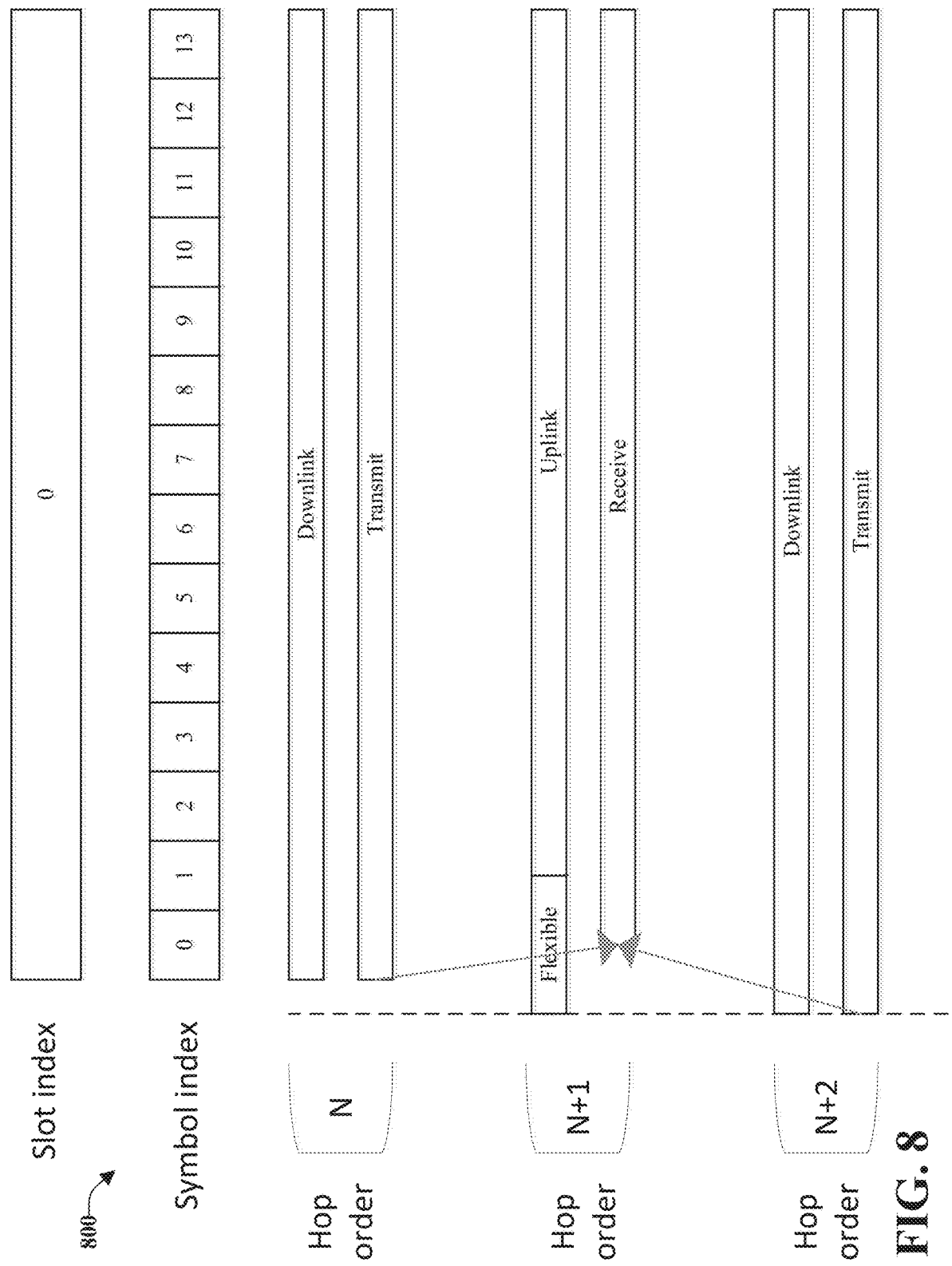
FIGS. 8-11 illustrate other example, non-limiting, timing advances in accordance with one or more embodiments described herein.
Figure 9:
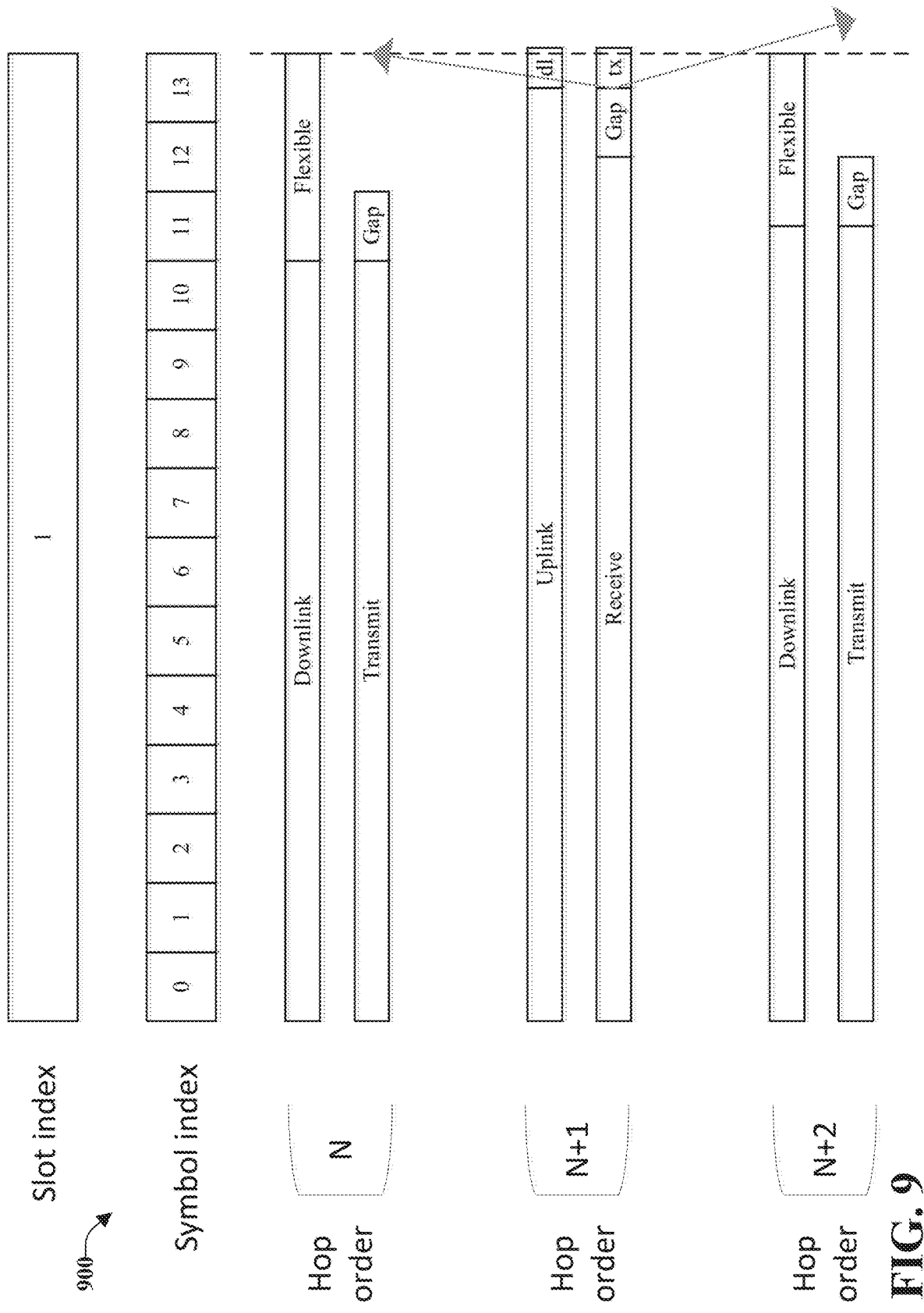
Figure 10:
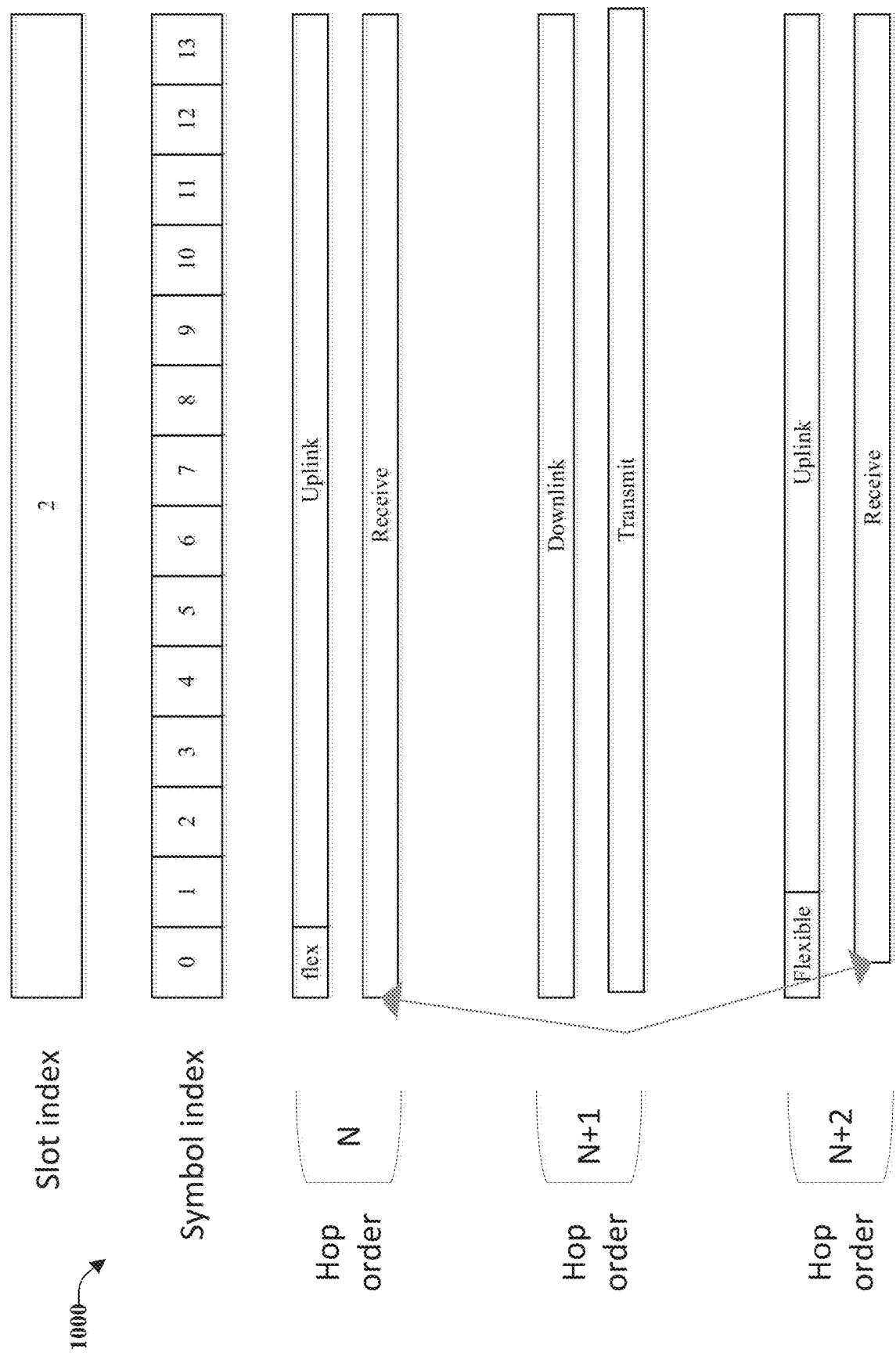
Figure 11:
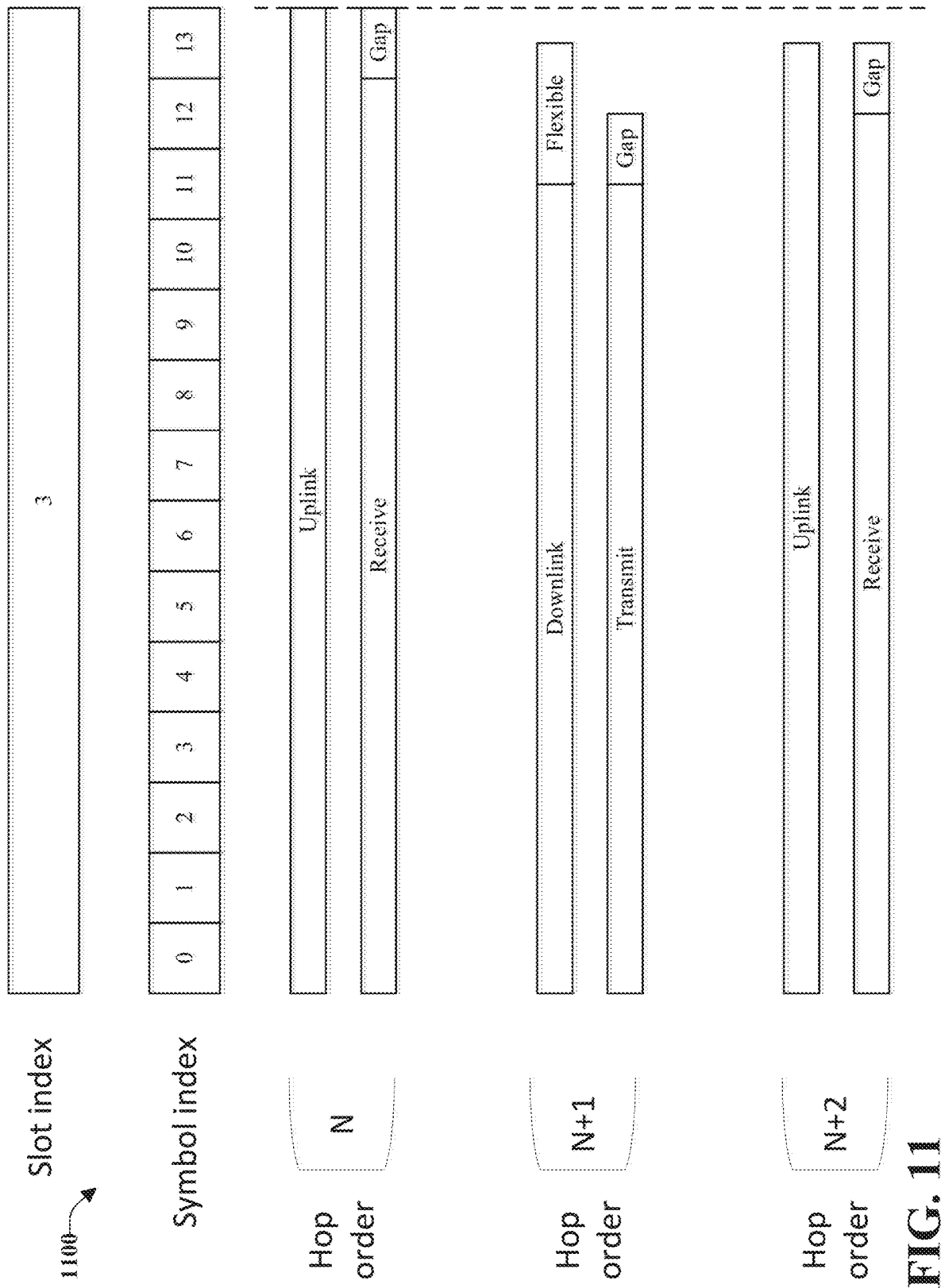
Figure 12:
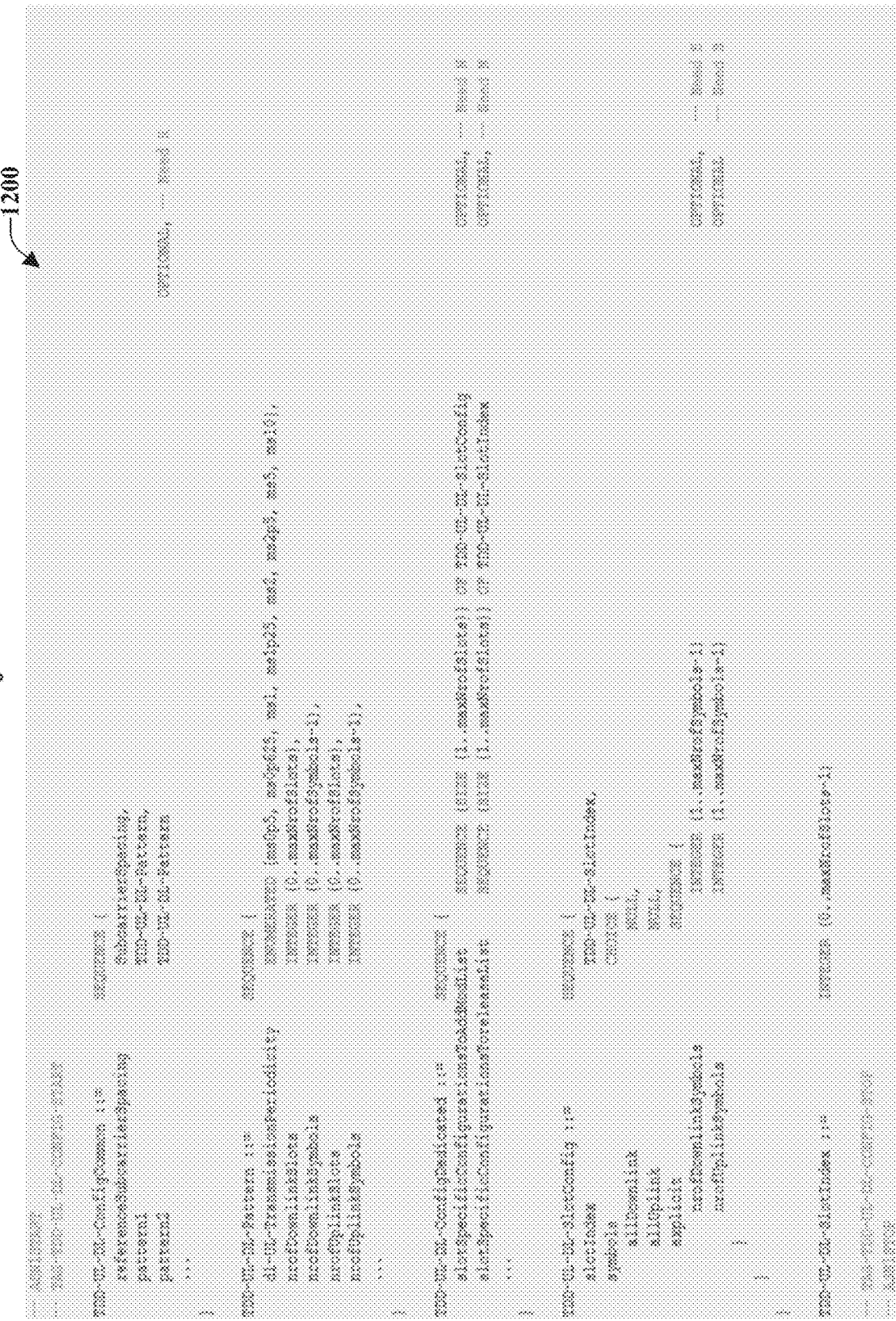
FIG. 12 illustrates an example, non-limiting, uplink/downlink time division duplex configuration information element according to various embodiments.

FIG. 12 illustrates a 3GPP NR Uplink/Downlink TDD configuration information element [3GPP TS 38.331 V15.2.1 (2018 June)]. According to 3GPP NR physical layer procedures for control [3GPP TS 38.213 V15.2.0 (2018 June)]:

For each serving cell
  If a UE is provided higher layer parameter tdd-UL-DL-ConfigurationCommon and the UE is not provided higher layer parameter tdd-UL-DL-ConfigurationCommon2, the UE sets the slot format per slot over a number of slots as indicated by higher layer parameter tdd-UL-DL-ConfigurationCommon. The higher layer parameter tdd-UL-DL-ConfigurationCommon provides
    A reference subcarrier spacing $\mu_{ref}$ by higher layer parameter referenceSubcarrierSpacing
    A slot configuration period of P msec by higher layer parameter dl-UL-TransmissionPeriodicity
    A number of slots $d_{slots}$ with only downlink symbols by higher layer parameter nrofDownlinkSlots
    A number of downlink symbols $d_{sym}$ by higher layer parameter nrofDownlinkSymbols
    A number of slots $u_{slots}$ with only uplink symbols by higher layer parameter nrofUplinkSlots
    A number of uplink symbols $u_{sym}$ by higher layer parameter nrofUplinkSymbols FIGS. 8-11 illustrate exemplary configurations according to Rel. 15 3GPP NR specifications. For example, FIG. 8 illustrates a configuration 800 for slot index 0; FIG. 9 illustrates a configuration 900 for slot index 1; FIG. 10 illustrates a configuration 1000 for slot index 2; and FIG. 11 illustrates a configuration 1100 for slot index 3.

A TDD-UL-DL-Pattern is configured with dl-UL-TransmissionPeriodicity equals ms0p5. nrofDownlinkSlots and nrofUplinkSlots is set to one, respectively. nrofDownlinkSymbols and nrofUplinkSymbols have different values for different hop orders. The donor DU always has hop order 0, a relay DU connected to a donor DU has hop order 1, a relay DU connected to another relay DU has hop order N+1 if the relay DU it is connected to has hop order N.

As illustrated, each TDD-UL-DL-Pattern starts with DL slots or DL symbols and ends with UL slots or UL symbols. For IAB systems, however, according to the above, it is desirable to also allow TDD UL/DL patterns that start with UL slots or symbols (see, for example, hop order N+1 in FIG. 8 for slot index zero).

According to some embodiments, new TDD-UL-DL-Pattern configurations allow for patterns that start with uplink slots, uplink symbols, or flexible symbols. Flexible symbols are symbols within a slot that are neither defined as downlink or uplink. In 3GPP NR Rel. 15, the number of flexible symbols is implicitly defined by the number of DL and UL symbols according to $(S-d_{slots}-u_{slots}) \cdot N_{symb}^{slot} - d_{sym} - u_{sym}$. $S = P \cdot 2^{\mu_{ref}}$ where $\mu_{ref}$ is the reference subcarrier spacing and P is the slot configuration period. According to hop order N+1 in FIGS. 8-11, the new TDD UL/DL pattern can start with (A) flexible symbols/slots, followed by (B) uplink symbols/slot, followed by (C) downlink symbols/slot, followed by (D) flexible symbols/slot. In an example, A, B, C, and/or D are configured explicitly. If one or more of A, B, C, and/or D is larger than the number of symbols in a slot, said values can either be configured by one parameter (e.g., number of symbols) or by two parameters (e.g., number of slots and number of symbols). Alternatively, one or more of A, B, C, and/or D can be configured implicitly. This requires rules to be specified, e.g., whether the pattern starts with downlink, uplink, or flexible, whether certain changes from {downlink, uplink, or flexible} to {downlink, uplink, or flexible} can only occur at certain boundaries relative to the TDD UL/DL pattern and so forth. This is similar to the Rel. 15 3GPP NR rules above where 3GPP TS 38.213 specifies a pattern starts with downlink, ends with uplink and undefined symbols are flexible symbols. Here, however, there can be two sets of flexible symbols separated by uplink symbols (see hop order N+1 in FIGS. 8-11) so novel rules according to the embodiments herein are proposed.

Instead of defining new patterns, in some embodiments, existing patterns can be shifted by K slots with respect to the radio frame boundary. The radio frame boundaries can be aligned across relay/donor DUs by their system frame number (SFN). For example, for hop order N+1 in FIGS. 8-11, K=2.

The backhaul configuration procedure 300 in FIG. 3 can be utilized to configure either the new patterns or existing patterns with the new offset value K among relay/donor DUs to achieve the coordination described herein and to fulfil the half-duplex constraint.

In accordance with some embodiments, instead of shifting an existing pattern or introducing a new pattern, additional downlink symbols/slots can be configured for hop orders that otherwise would have started with UL or flexible symbols/slots. These additional downlink symbols/slots result in these symbols/slots being downlink symbols/slots at all relay/donor DUs in the network. They can then be used to transmit synchronization signals 304 and broadcast channels 308 from all relay/donor DUs in the network in a coordinated manner. This allows UEs and UE functions of relay DUs to be configured with a single measurement gap. Otherwise, because different hop orders start with either downlink or non-downlink symbols, multiple measurement gaps would be required. Since a UE or UE functions of relay DU cannot receive data during a measurement gap, a single measurement gap can be utilized.

According to some embodiments, new slot configuration periods P other than those specified in 3GPP NR Rel. 15 are introduced into the Radio Resource Control (RRC) protocol specification. For example, FIG. 7 illustrates a slot configuration period of 0.25 ms assuming the reference subcarrier spacing is 120 kHz. Regardless of whether such new slot configuration periods are introduced into the RRC protocol specification, it should be possible to signal new slot configuration periods among relay/donor DUs using the backhaul configuration procedure 300 in FIG. 3. For example, an F1* application protocol similar to the F1 interface in FIG. 1 can be defined to configure relay DUs. Alternatively, the RRC protocol can be used to configure the relay DU via its UE function (e.g., the UE function 202 of FIG. 2). Regardless the details, donor/relay DUs can coordinate their downlink and uplink transmissions. The donor/relay DUs can then instruct UEs whether a given symbol is downlink or uplink by using 3GPP NR Rel. 15 procedures even when the UEs are not configured with TDD UL/DL patterns or, alternatively, are configured with Rel. 15 3GPP NR that do not adhere to the Rel. 16 patterns relay/donor DUs use to coordinate according to the embodiments herein. If the 3GPP NR Rel. 16 RRC protocol adopts the embodiments herein also for UEs, UEs can likewise be informed of the patterns negotiated among relay/donor DUs. This can result in energy savings at the UE. For example, if a UE is aware that certain resources are uplink resources, it is not required to monitor for downlink control channel transmissions.

As illustrated in FIGS. 8-11, the slot boundaries of hop order N and hop order N+2 are not aligned. If relay DU of hop order N+2 aligned its slot boundary with that of hop order N, relay DU of hop order N+1 would receive asynchronous transmissions of hop orders N and N+2. For example, hop order N may be transmitting to hop order N+1 on the backhaul link (downlink of hop order N) whereas hop order N+2 may also be transmitting to hop order N+1 on another backhaul link (downlink of hop order N+2). In addition, hop order N+1 may be receiving uplink transmissions from UEs connected to relay DU of hop order N+1. While the relay DU of hop order N+1 can change the timing advance of UEs connected to it, because the downlink timing of relay DUs is fixed to the slot boundary of the relay DU of hop order N, e.g., the donor DU, the transmission timing of relay DUs cannot be altered. In symmetric deployments (e.g., FIG. 7) this is not a problem, however, in asymmetric deployments (e.g., FIGS. 8-11) with arbitrary distances (e.g. propagation delays) if the donor/relay DUs align their downlink transmission timing, the receivers in general will receive asynchronous transmissions.

In order to allow either a relay DU and a UE or, alternatively, two relay DUs to transmit in an asynchronous fashion (because relay DUs align their downlink timing, for example, slot boundaries with arbitrary distances among them) a novel receiver with corresponding reference signal structure and rate matching procedure are provided herein.

Figure 13:
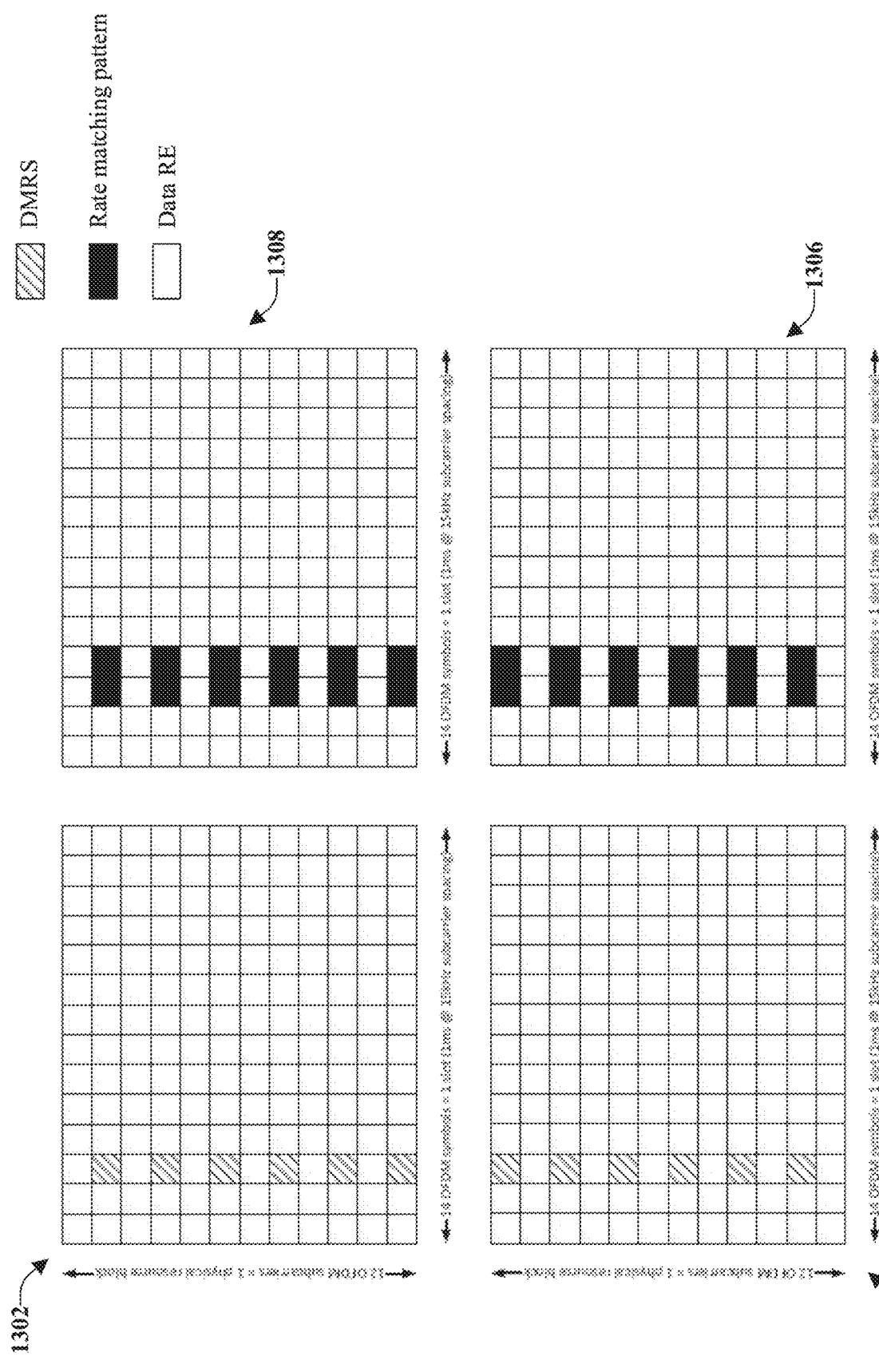
FIG. 13 illustrates an example, non-limiting, configuration of a single symbol front loaded demodulation reference symbol pattern in accordance with one or more embodiments described herein.

Now referring to FIG. 13, in some embodiments, two transmitters (e.g., two UE functions of two relay DUs or a UE function of a relay DU and a UE) are configured with DMRS patterns according to FIG. 13 (left hand side). However, for the purpose of rate matching data transmissions around the DMRS, two symbols are configured for each tone carrying DMRS. In other words, the DMRS pattern on the left hand side is replicated in time (right hand side). The same principle applies when additional DMRS is configured, e.g., FIG. 14 or when two DMRS symbols are configured at the beginning of the slot (FIG. 15). Moreover, the two transmitters can shift their respective DMRS and rate matching patterns with respect to one another. For example, one transmitter may send its DMRS on even subcarriers/tones (top left portions of the figures, indicated at 1302 of FIG. 13, 1402 of FIG. 14, and 1502 of FIG. 15) whereas another transmitter may send its DMRS on odd subcarriers/tones (bottom left portions of the figures, indicated at 1304 of FIG. 13, 1404 of FIG. 14, and 1504 of FIG. 15). The transmitter that sends its DMRS on even subcarriers/tones rate matches on odd subcarriers/tones (bottom right portions of the figures, indicated at 1306 of FIG. 13, 1406 of FIG. 14, and 1506 of FIG. 15) and the transmitter that sends its DMRS on odd subcarriers/tones rate matches on even subcarriers/tones (top right portions of the figures, indicated at 1308 of FIG. 13, 1408 of FIG. 14, and 1508 of FIG. 15). This way DMRS is orthogonal among the two transmitters in time and frequency even though the OFDM symbols are not aligned with each other in time. The receiver can use the DMRS to estimate the timing offset between the two transmissions. Note that while DMRS between the two transmissions is orthogonal, data resource elements (REs) are not. When the receiver tries to demodulate the two transmissions it can use the estimated timing offset to equalize the asynchronous transmissions.

In further detail, the configuration for a given transmitter can be as follows: top left DMRS (at 1302, 1402, and/or 1502) is paired with bottom right rate matching pattern (at 1306, 1406, and/or 1506) (e.g., first transmitter). The bottom left DMRS (at 1304, 1404, and/or 1504) is paired with the top right rate matching pattern (at 1308, 1408, and/or 1508) (e.g., second transmitter). In such a manner, a given transmitter can protect the DMRS on the other transmitter by rate matching around it.

Figure 16:
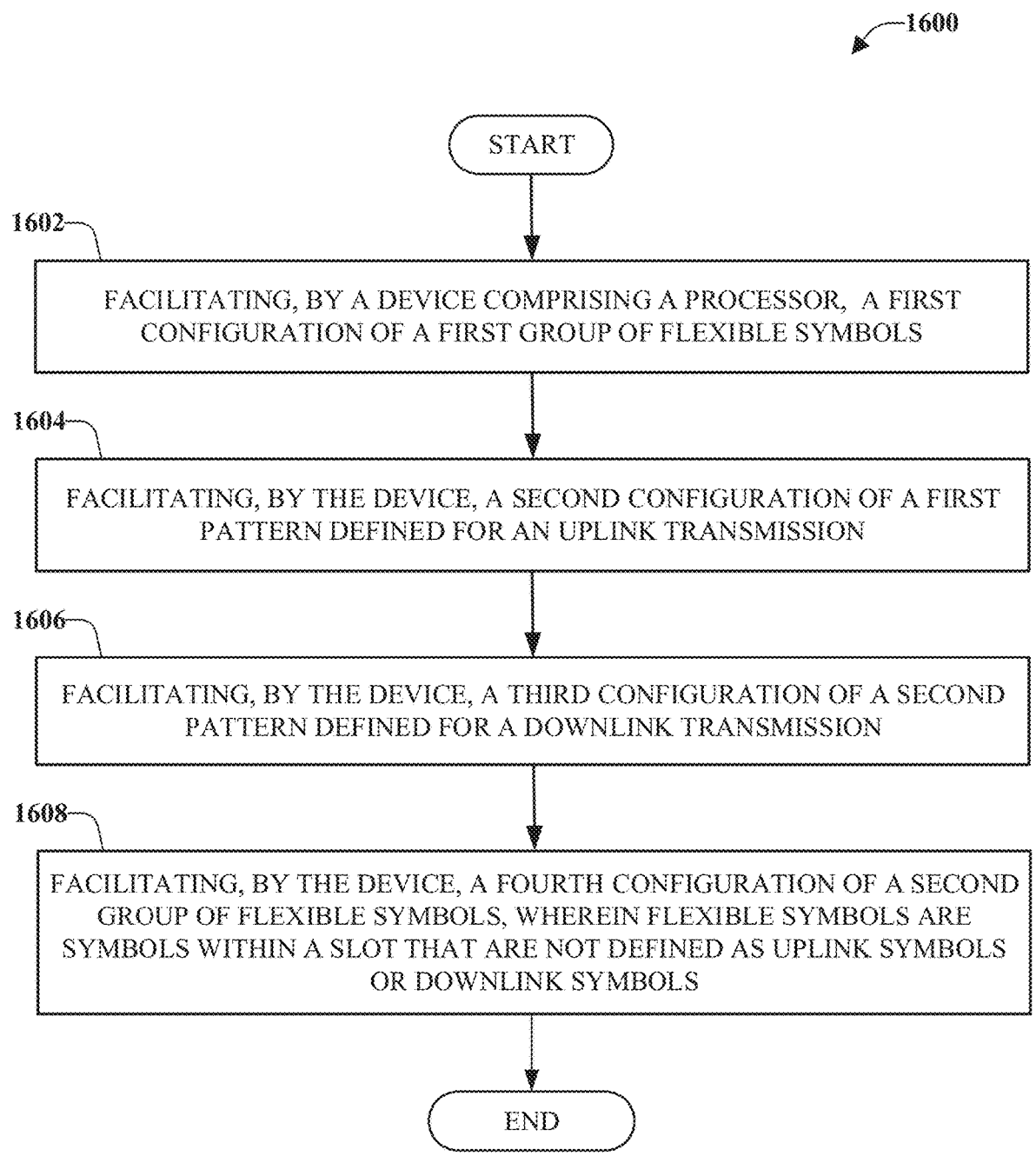
FIG. 16 illustrates an example, non-limiting, method for frame structure coordination in accordance with one or more embodiments described herein.

FIG. 16 illustrates an example, non-limiting, method 1600 for frame structure coordination in accordance with one or more embodiments described herein. Repetitive description of like elements employed in other embodiments described herein is omitted for sake of brevity.

The method 1600 can be implemented by a network device (e.g., the relay DU 104, the donor DU 108, and/or another device) of a wireless network, the network device comprising a processor. Alternatively, or additionally, a machine-readable storage medium can comprise executable instructions that, when executed by a processor, facilitate performance of operations for the method 1600.

The method 1600 starts, at 1602, with facilitating a first configuration of a first group of flexible symbols. The method 1600, at 1604 can facilitate a second configuration of a first pattern defined for an uplink transmission. In an example, the first pattern can be aligned with a last symbol of a first frame defined for the uplink transmission. In some implementations, there can be, for example, one partial frame followed by three full UL frames. Therefore, according to this example, the "last symbol" can be the last symbol of the fourth frame.

Further, at 1606, the method 1600 can facilitate a third configuration of a second pattern defined for a downlink transmission. In an example, the second pattern can be aligned with a first symbol of a second frame defined for the downlink transmission. Further, the last symbol of the first frame and the first symbol of the second frame be contiguous symbols. In some implementations, there can be, for example, one partial frame followed by three full UL frames. Therefore, according to this example, the "first symbol" can be the first symbol of a fifth frame.

A fourth configuration of a second group of flexible symbols can be facilitated at 1608. Flexible symbols are symbols within a slot that are not defined as uplink symbols or downlink symbols. In an example, a first number of flexible symbols in the first group of flexible symbols can be defined based on a first length of the first pattern and a second length of a transmission frame. Further, a second number of flexible symbols in the second group of flexible symbols can be defined based on a third length of the second pattern and the second length of the transmission frame.

According to some implementations, the method can comprise explicitly indicating a transmission configuration. The transmission configuration can comprise a first indication of the first group of flexible symbols, a second indication of the first pattern, a third indication of the second pattern, and a fourth indication of the second group of flexible symbols.

In accordance with some implementations, a transmission configuration can be implicitly indicated. For example, the transmission configuration can comprise a first indication of the first group of flexible symbols, a second indication of the first pattern, and a third indication of the second pattern, and a fourth indication of the second group of flexible symbols.

According to some implementations, the method can comprise determining that respective values of at least one of the first group of flexible symbols, the first pattern, the second pattern, and the second group of flexible symbols are larger than a first number of symbols in the slot. Further to these implementations, the method can comprise configuring the first group of flexible symbols, the first pattern, the second pattern, and the second group of flexible symbols with respective single parameters based on the determining. The respective single parameters can comprise respective indications of respective second numbers of symbols.

In accordance with some implementations, the method can comprise determining that respective values of at least one of the first group of flexible symbols, the first pattern, the second pattern, and the second group of flexible symbols are larger than a first number of symbols in the slot. Further to these implementations, the method can comprise configuring the first group of flexible symbols, the first pattern, the second pattern, and the second group of flexible symbols with respective first parameters and respective second parameters based on the determining. The respective first parameters can comprise first indications of respective slots. The respective second parameters can comprise second indications of respective second numbers of symbols.

Figure 17:
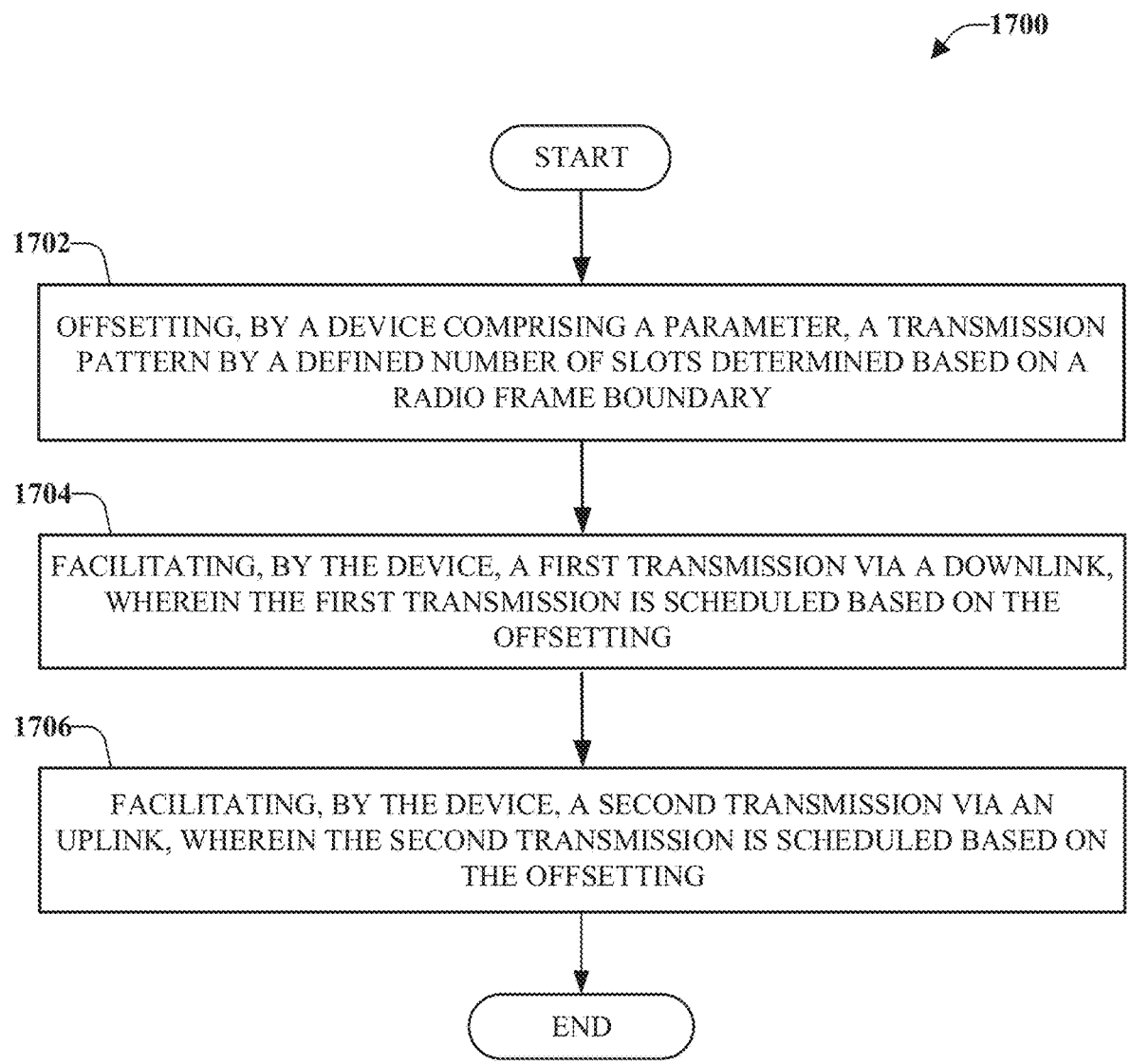
FIG. 17 illustrates another example, non-limiting, method for frame structure coordination in accordance with one or more embodiments described herein.

FIG. 17 illustrates another example, non-limiting, method 1700 for frame structure coordination in accordance with one or more embodiments described herein. Repetitive description of like elements employed in other embodiments described herein is omitted for sake of brevity.

The method 1700 can be implemented by a network device (e.g., the relay DU 104, the donor DU 108, and/or another device) of a wireless network, the network device comprising a processor. Alternatively, or additionally, a machine-readable storage medium can comprise executable instructions that, when executed by a processor, facilitate performance of operations for the method 1700.

The method 1700 can start, at 1702, with offsetting, by a device comprising a processor, a transmission pattern by a defined number of slots determined based on a radio frame boundary. In an example, the offsetting can be based on a defined number of slots. In another example, the offsetting can be based on a length of a downlink transmission. According to an implementation, the radio frame boundary can be aligned across devices (e.g., the donor DU, the relay DU) by a system frame number.

In an example, offsetting the transmission pattern can comprise aligning the first transmission with a first symbol of a frame defined for the downlink. In another example, offsetting the transmission pattern can comprise aligning the second transmission with a last symbol of a frame defined for the uplink.

Further, at 1704, a first transmission can be facilitated via a downlink. The first transmission can be scheduled based on the offsetting. At 1706, a second transmission can be facilitated via an uplink. The second transmission can be scheduled based on the offsetting. In an example where the offsetting is based on the downlink transmission, prior to facilitating the first transmission, another transmission can be facilitated via the downlink. Accordingly, a first downlink transmission can be sent, followed by a second downlink transmission, followed by the uplink transmission (with any appropriate flexible symbols and/or gaps therebetween). Thus, two consecutive downlink transmissions can be sent prior to an uplink transmission.

Figure 18:
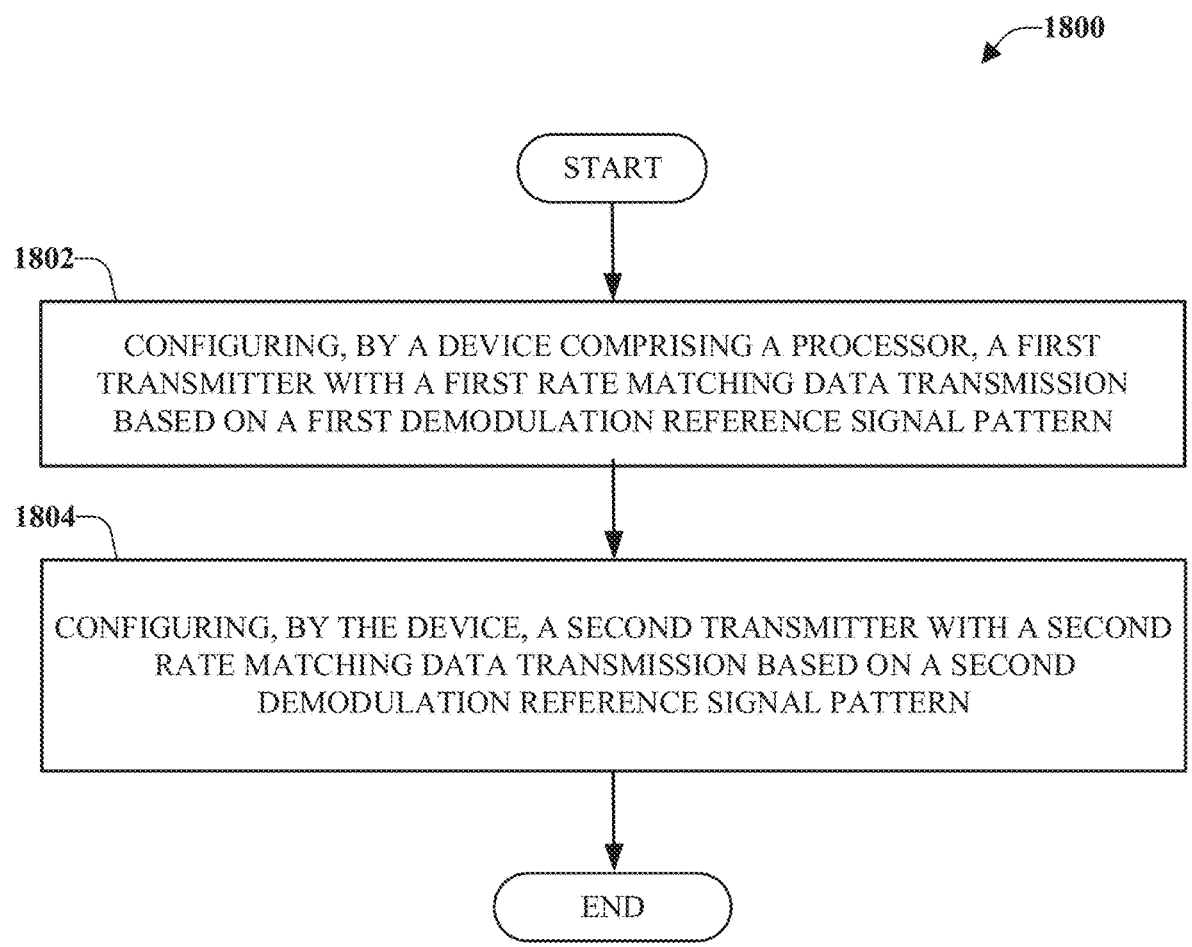
FIG. 18 illustrates a further example, non-limiting, method for frame structure coordination in accordance with one or more embodiments described herein.

FIG. 18 illustrates a further example, non-limiting, method 1800 for frame structure coordination in accordance with one or more embodiments described herein. Repetitive description of like elements employed in other embodiments described herein is omitted for sake of brevity.

The method 1800 can be implemented by a network device (e.g., a CU 112, the relay DU 104, the donor DU 108, and/or another device) of a wireless network, the network device comprising a processor. Alternatively, or additionally, a machine-readable storage medium can comprise executable instructions that, when executed by a processor, facilitate performance of operations for the method 1800.

Figure 14:
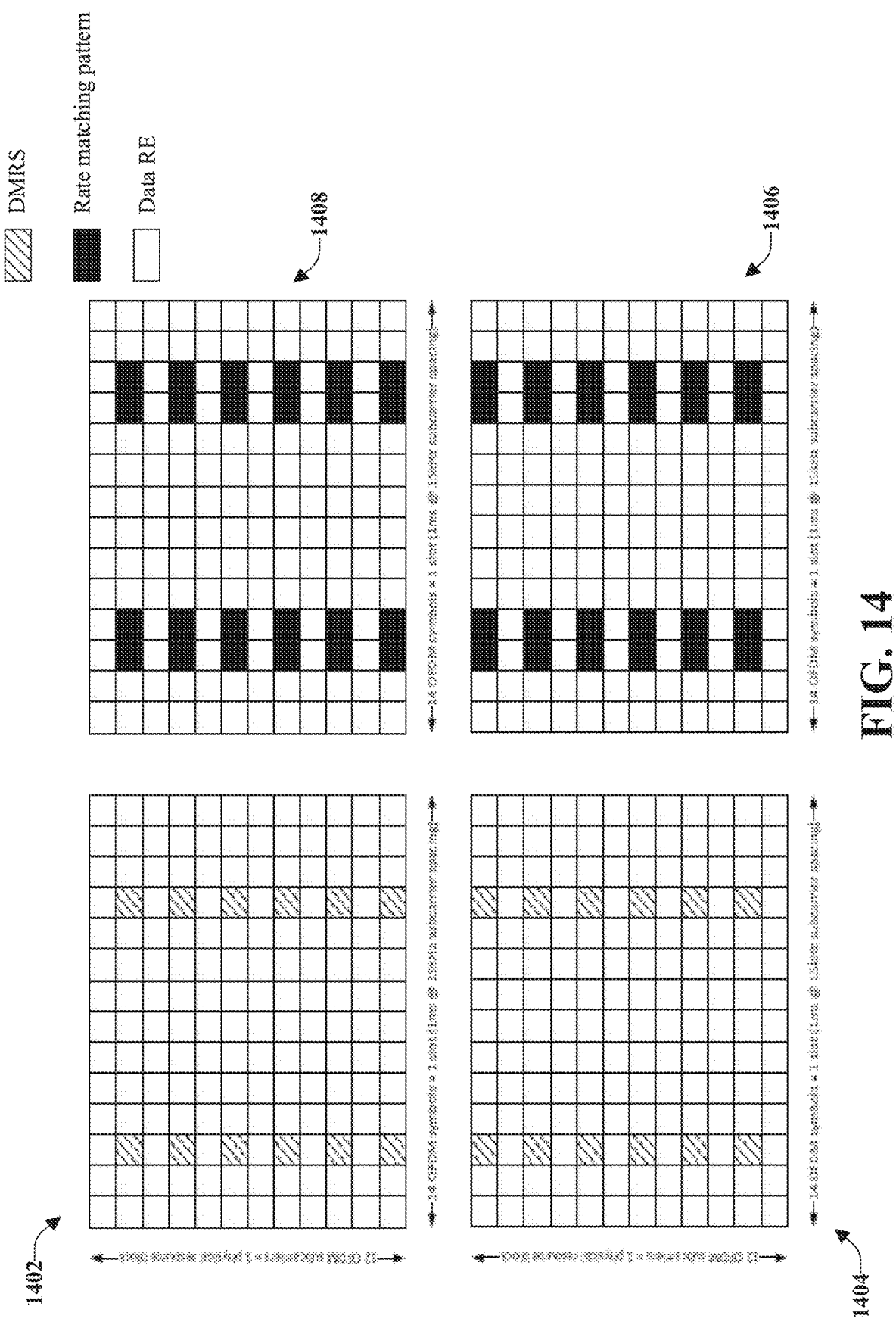
FIG. 14 illustrates an example, non-limiting, configuration of a single symbol front loaded demodulation reference symbol pattern with an additional demodulation reference symbol in accordance with one or more embodiments described herein.
Figure 15:
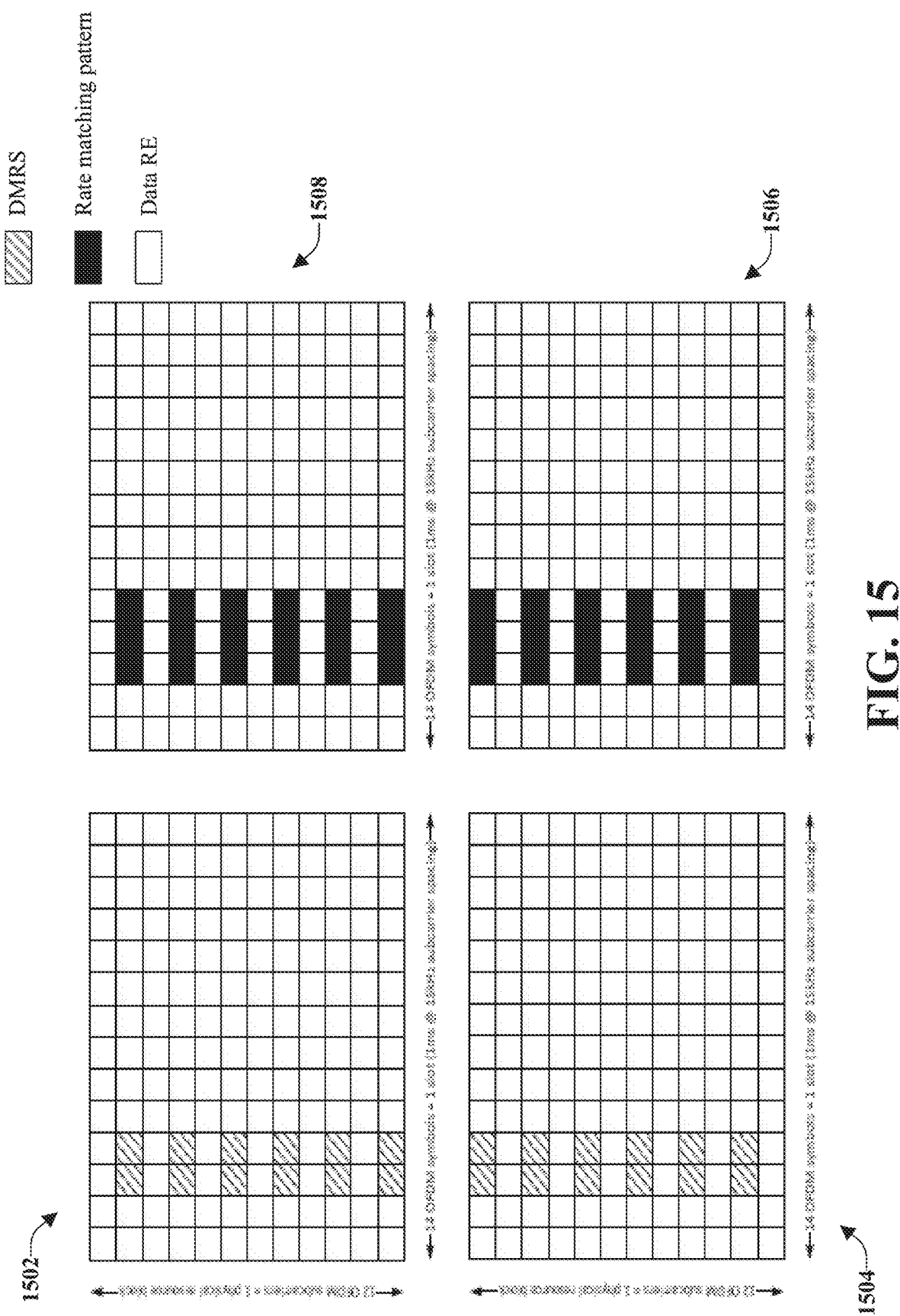
FIG. 15 illustrates an example, non-limiting, configuration of a two-symbol front loaded demodulation reference symbol pattern in accordance with one or more embodiments described herein.

The method 1800 can start, at 1802, with configuring a first transmitter (e.g., a relay, a UE, and so on) with a first rate matching data transmission based on a first demodulation reference signal pattern (e.g., as depicted in FIGS. 13-15). At 1804, a second transmitter (e.g., a relay, a UE, and so on) can be configured with a second rate matching data transmission based on a second demodulation reference signal pattern (e.g., a depicted in FIGS. 13-15).

According to some implementations, the method can comprise shifting the first rate matching data transmission and the first demodulation reference signal pattern with respect to the second rate matching data transmission and the second demodulation reference signal pattern.

According to some implementations, the method can comprise configuring the first transmitter to send the first demodulation reference signal pattern on a first set of tones (e.g., even subcarriers/tones, odd subcarriers/tones). Further the method can comprise configuring the second transmitter to send the second demodulation reference signal pattern on a second set of tones (e.g., odd subcarriers/tones, even subcarriers/tones). For example, the first set of subcarriers/tones can be even subcarriers/tones and the second set of subcarriers/tones can be odd subcarriers/tones. In another example, the first set of subcarriers/tones can be odd subcarriers/tones and the second set of subcarriers/tones can be even subcarriers/tones.

According to some implementations, the first demodulation reference signal pattern and the second demodulation reference signal pattern are respective single symbol front loaded demodulation reference symbol patterns. In some implementations, the first demodulation reference signal pattern and the second demodulation reference signal pattern are respective single symbol front loaded demodulation reference symbol patterns with an additional demodulation reference symbol. In further implementations, the first demodulation reference signal pattern and the second demodulation reference signal pattern are respective two-symbol front loaded demodulation reference symbol patterns.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Described herein are systems, methods, articles of manufacture, and other embodiments or implementations that can facilitate channel state information determination using demodulation reference signals in advanced networks. Facilitating channel state information determination using demodulation reference signals in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Figure 19:
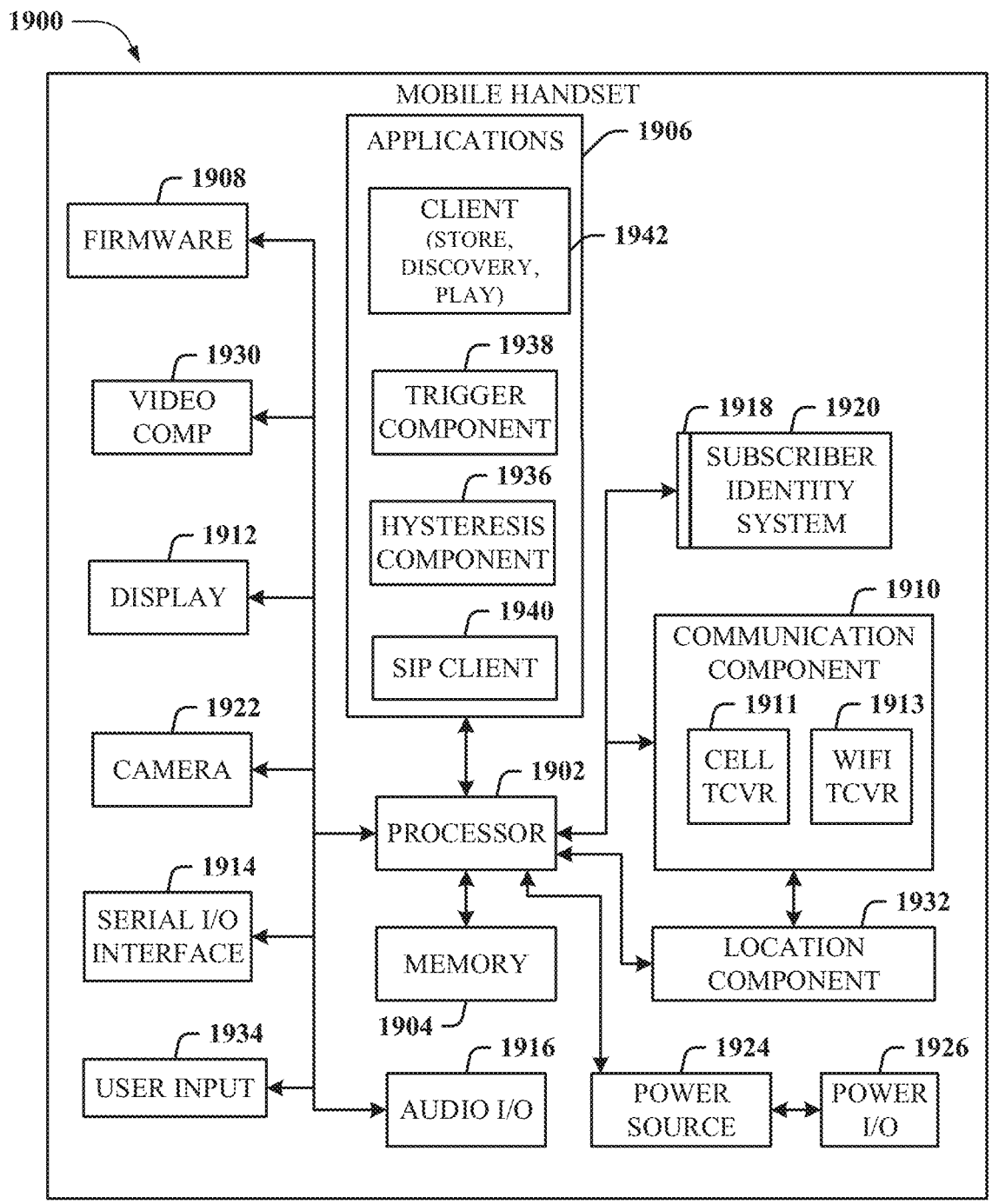
FIG. 19 illustrates an example block diagram of an example mobile handset operable to engage in a system architecture that facilitates wireless communications according to one or more embodiments described herein.

Referring now to FIG. 19, illustrated is an example block diagram of an example mobile handset 1900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1902 for controlling and processing all onboard operations and functions. A memory 1904 interfaces to the processor 1902 for storage of data and one or more applications 1906 (e.g., a video player software, user feedback component software, etc.). Other applications can include voice recognition of predetermined voice commands that facilitate initiation of the user feedback signals. The applications 1906 can be stored in the memory 1904 and/or in a firmware 1908, and executed by the processor 1902 from either or both the memory 1904 or/and the firmware 1908. The firmware 1908 can also store startup code for execution in initializing the handset 1900. A communications component 1910 interfaces to the processor 1902 to facilitate wired/wireless communication with external systems, e.g., cellular networks, VoIP networks, and so on. Here, the communications component 1910 can also include a suitable cellular transceiver 1911 (e.g., a GSM transceiver) and/or an unlicensed transceiver 1913 (e.g., Wi-Fi, WiMax) for corresponding signal communications. The handset 1900 can be a device such as a cellular telephone, a PDA with mobile communications capabilities, and messaging-centric devices. The communications component 1910 also facilitates communications reception from terrestrial radio networks (e.g., broadcast), digital satellite radio networks, and Internet-based radio services networks.

The handset 1900 includes a display 1912 for displaying text, images, video, telephony functions (e.g., a Caller ID function), setup functions, and for user input. For example, the display 1912 can also be referred to as a "screen" that can accommodate the presentation of multimedia content (e.g., music metadata, messages, wallpaper, graphics, etc.). The display 1912 can also display videos and can facilitate the generation, editing and sharing of video quotes. A serial I/O interface 1914 is provided in communication with the processor 1902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1900, for example. Audio capabilities are provided with an audio I/O component 1916, which can include a speaker for the output of audio signals related to, for example, indication that the user pressed the proper key or key combination to initiate the user feedback signal. The audio I/O component 1916 also facilitates the input of audio signals through a microphone to record data and/or telephony voice data, and for inputting voice signals for telephone conversations.

The handset 1900 can include a slot interface 1918 for accommodating a SIC (Subscriber Identity Component) in the form factor of a card Subscriber Identity Module (SIM) or universal SIM 1920, and interfacing the SIM card 1920 with the processor 1902. However, it is to be appreciated that the SIM card 1920 can be manufactured into the handset 1900, and updated by downloading data and software.

The handset 1900 can process IP data traffic through the communications component 1910 to accommodate IP traffic from an IP network such as, for example, the Internet, a corporate intranet, a home network, a person area network, etc., through an ISP or broadband cable provider. Thus, VoIP traffic can be utilized by the handset 1900 and IP-based multimedia content can be received in either an encoded or decoded format.

A video processing component 1922 (e.g., a camera) can be provided for decoding encoded multimedia content. The video processing component 1922 can aid in facilitating the generation, editing, and sharing of video quotes. The handset 1900 also includes a power source 1924 in the form of batteries and/or an AC power subsystem, which power source 1924 can interface to an external power system or charging equipment (not shown) by a power I/O component 1926.

The handset 1900 can also include a video component 1930 for processing video content received and, for recording and transmitting video content. For example, the video component 1930 can facilitate the generation, editing and sharing of video quotes. A location tracking component 1932 facilitates geographically locating the handset 1900. As described hereinabove, this can occur when the user initiates the feedback signal automatically or manually. A user input component 1934 facilitates the user initiating the quality feedback signal. The user input component 1934 can also facilitate the generation, editing and sharing of video quotes. The user input component 1934 can include such conventional input device technologies such as a keypad, keyboard, mouse, stylus pen, and/or touchscreen, for example.

Referring again to the applications 1906, a hysteresis component 1936 facilitates the analysis and processing of hysteresis data, which is utilized to determine when to associate with the access point. A software trigger component 1938 can be provided that facilitates triggering of the hysteresis component 1936 when the Wi-Fi transceiver 1913 detects the beacon of the access point. A SIP client 1940 enables the handset 1900 to support SIP protocols and register the subscriber with the SIP registrar server. The applications 1906 can also include a client 1942 that provides at least the capability of discovery, play and store of multimedia content, for example, music.

The handset 1900, as indicated above related to the communications component 1910, includes an indoor network radio transceiver 1913 (e.g., Wi-Fi transceiver). This function supports the indoor radio link, such as IEEE 802.11, for the dual-mode GSM handset 1900. The handset 1900 can accommodate at least satellite radio services through a handset that can combine wireless voice and digital radio chipsets into a single handheld device.

Figure 20:
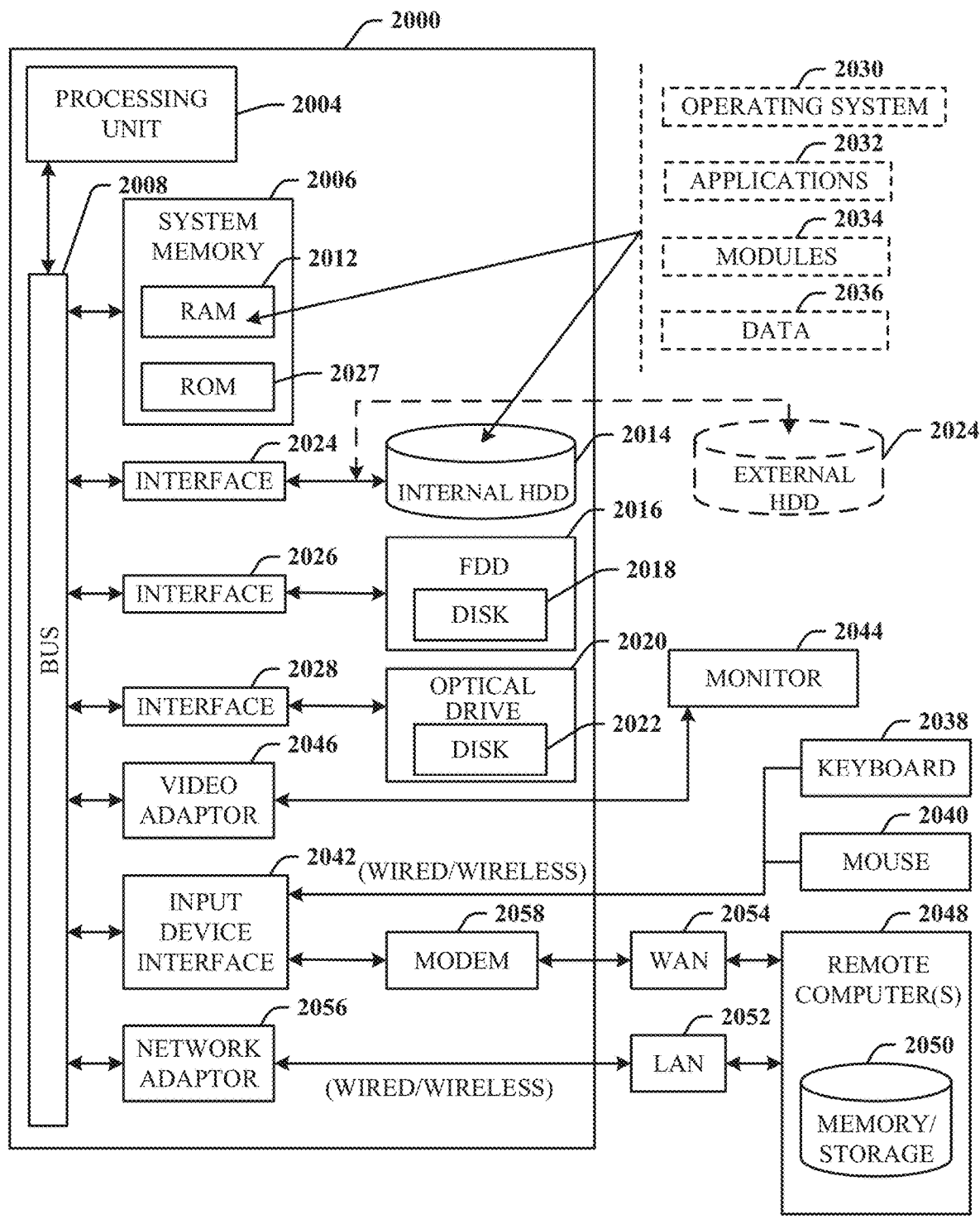
FIG. 20 illustrates an example block diagram of an example computer operable to engage in a system architecture that facilitates wireless communications according to one or more embodiments described herein.

Referring now to FIG. 20, illustrated is an example block diagram of an example computer 2000 operable to engage in a system architecture that facilitates wireless communications according to one or more embodiments described herein. The computer 2000 can provide networking and communication capabilities between a wired or wireless communication network and a server (e.g., Microsoft server) and/or communication device. In order to provide additional context for various aspects thereof, FIG. 20 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 20, implementing various aspects described herein with regards to the end-user device can include a computer 2000, the computer 2000 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes read-only memory (ROM) 2027 and random access memory (RAM) 2012. A basic input/output system (BIOS) is stored in a non-volatile memory 2027 such as ROM, EPROM, EEPROM, which BIOS contains the basic routines that help to transfer information between elements within the computer 2000, such as during start-up. The RAM 2012 can also include a high-speed RAM such as static RAM for caching data.

The computer 2000 further includes an internal hard disk drive (HDD) 2014 (e.g., EIDE, SATA), which internal hard disk drive 2014 can also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 2000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is to be appreciated that the innovation can be implemented with various commercially available operating systems or combinations of operating systems.

A user can enter commands and information into the computer 2000 through one or more wired/wireless input devices, e.g., a keyboard 2038 and a pointing device, such as a mouse 2040. Other input devices (not shown) can include a microphone, an IR remote control, a joystick, a game pad, a stylus pen, touchscreen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 through an interface, such as a video adapter 2046. In addition to the monitor 2044, a computer 2000 typically includes other peripheral output devices (not shown), such as speakers, printers, etc.

The computer 2000 can operate in a networked environment using logical connections by wired and/or wireless communications to one or more remote computers, such as a remote computer(s) 2048. The remote computer(s) 2048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2000 is connected to the local network 2052 through a wired and/or wireless communication network interface or adapter 2056. The adapter 2056 can facilitate wired or wireless communication to the LAN 2052, which can also include a wireless access point disposed thereon for communicating with the wireless adapter 2056.

When used in a WAN networking environment, the computer 2000 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 through the input device interface 2042. In a networked environment, program modules depicted relative to the computer, or portions thereof, can be stored in the remote memory/storage device 2050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. Network relay equipment, comprising:
   a processor; and
   a memory that stores executable instructions that, when executed by the processor, facilitate performance of operations, comprising:
      defining a first configuration of a first pattern defined for a downlink transmission, wherein the first pattern begins with a first uplink slot; and
      transmitting, to donor equipment, the first configuration for use during backhaul communications between the network relay equipment and the donor equipment.

2. The network relay equipment of claim 1, wherein the operations further comprise aligning the first pattern with a first symbol of a first frame defined for the downlink transmission.

3. The network relay equipment of claim 2, wherein the operations further comprise:
   defining a second configuration of the second pattern defined for an uplink transmission, wherein the second pattern begins with the first uplink slot; and
   transmitting, to the donor equipment, the second configuration for use during the backhaul communications between the network relay equipment and the donor equipment.

4. The network relay equipment of claim 3, wherein the operations further comprise aligning the second pattern with a last symbol of a second frame defined for the uplink transmission.

5. The network relay equipment of claim 4, wherein the last symbol of the second frame and the first symbol of the first frame are contiguous symbols.

6. The network relay equipment of claim 3, wherein the operations further comprise:
   defining a third configuration applicable to a first group of flexible symbols; and
   transmitting, to the donor equipment, the third configuration for use during the backhaul communications between the network relay equipment and the donor equipment.

7. The network relay equipment of claim 6, wherein the operations further comprise:
   defining a fourth configuration applicable to a second group of flexible symbols; and
   transmitting, to the donor equipment, the fourth configuration for use during the backhaul communications between the network relay equipment and the donor equipment.

8. A method, comprising:
   defining, by relay equipment comprising a processor, a first configuration of a first pattern defined for a downlink transmission, wherein the first pattern begins with a first uplink symbol; and
   transmitting, by the relay equipment, to donor equipment, the first configuration for use during backhaul communications between the relay equipment and the donor equipment.

9. The method of claim 8, further comprising aligning the first pattern with a first symbol of a first frame defined for the downlink transmission.

10. The method of claim 9, further comprising:
    defining, by the relay equipment, a second configuration of a second pattern defined for an uplink transmission, wherein the second pattern begins with the first uplink symbol; and
    transmitting, by the relay equipment to the donor equipment, the second configuration for use during the backhaul communications between the relay equipment and the donor equipment.

11. The method of claim 10, further comprising aligning, by the relay equipment, the second pattern with a last symbol of a second frame defined for the uplink transmission.

12. The method of claim 11, wherein the last symbol of the second frame and the first symbol of the first frame are contiguous symbols.

13. The method of claim 10, further comprising:
    defining, by the relay equipment, a third configuration of a first group of flexible symbols; and
    transmitting, by the relay equipment to the donor equipment, the third configuration for use during the backhaul communications between the relay equipment and the donor equipment.

14. The method of claim 13, further comprising
    defining, by the relay equipment, a fourth configuration of a second group of flexible symbols; and
    transmitting, by the relay equipment to the donor equipment, the fourth configuration for use during the backhaul communications between the relay equipment and the donor equipment.

15. A non-transitory machine-readable medium, comprising executable instructions that, when executed by a processor of a relay device, facilitate performance of operations, comprising:
    defining a first configuration of a first pattern defined for a downlink transmission, wherein the first pattern begins with a first uplink slot or a first uplink symbol; and
    transmitting, to a donor device, the first configuration for use during backhaul communications between the relay device and the donor device.

16. The non-transitory machine-readable medium of claim 15, wherein the operations further comprise aligning the first pattern with a first symbol of a first frame defined for the downlink transmission.

17. The non-transitory machine-readable medium of claim 16, wherein the operations further comprise:
- defining a second configuration of a second pattern defined for an uplink transmission, wherein the second pattern begins with the first uplink slot or the first uplink symbol; and
- transmitting, to the donor device, the second configuration for use during the backhaul communications between the relay device and the donor device.

18. The non-transitory machine-readable medium of claim 17, wherein the operations further comprise aligning the second pattern with a last symbol of a second frame defined for the uplink transmission.

19. The non-transitory machine-readable medium of claim 18, wherein the last symbol of the second frame and the first symbol of the first frame are contiguous symbols.

20. The non-transitory machine-readable medium of claim 17, wherein the operations further comprise:
- defining a third configuration associated with a first group of flexible symbols;
- defining a fourth configuration associated with a second group of flexible symbols; and
- transmitting, to the donor device, the third configuration and the fourth configuration for use during the backhaul communications between the relay device and the donor device.

* * * * *